United States Patent
Feng et al.

(10) Patent No.: US 9,681,380 B2
(45) Date of Patent: Jun. 13, 2017

(54) RADIO DATA COMMUNICATION METHOD, BASE STATION, AND USER EQUIPMENT

(71) Applicant: Huawei Technologies Co., Ltd., Shenzhen, Guangdong (CN)

(72) Inventors: Li Feng, Xi'an (CN); Xiaoxiao Zheng, Shanghai (CN); Lingli Pang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 14/335,390

(22) Filed: Jul. 18, 2014

(65) Prior Publication Data
US 2014/0348046 A1 Nov. 27, 2014

Related U.S. Application Data

(63) Continuation of application No. PCT/CN2013/070754, filed on Jan. 21, 2013.

(30) Foreign Application Priority Data

Jan. 19, 2012 (CN) .......................... 2012 1 0017449
Sep. 25, 2012 (CN) .......................... 2012 1 0360759

(51) Int. Cl.
*H04W 52/02* (2009.01)
*H04W 76/04* (2009.01)

(52) U.S. Cl.
CPC ..... *H04W 52/0229* (2013.01); *H04W 76/048* (2013.01); *H04W 76/046* (2013.01)

(58) Field of Classification Search
CPC ........... H04W 52/0229; H04W 76/046; H04W 76/048
See application file for complete search history.

(56) References Cited

U.S. PATENT DOCUMENTS 9,100,914 B2 * 8/2015 Wanstedt .......... H04W 52/0216
2009/0196197 A1 8/2009 Digirolamo et al.
(Continued)

FOREIGN PATENT DOCUMENTS

CN 102047718 A 5/2011
CN 102271318 A 12/2011
(Continued)

OTHER PUBLICATIONS

"The Solutions of UE Battery Life Improvement and Signaling Reduction," 3GPP TSG-RAN WG2 #76, San Francisco, California, R2-115841, pp. 1-3, 3$^{rd}$ Generation Partnership Project, Valbonne, France (Nov. 14-18, 2011).

(Continued)

*Primary Examiner* — Paul H Masur
(74) *Attorney, Agent, or Firm* — Leydig, Voit & Mayer, Ltd.

(57) ABSTRACT

Embodiments of the present invention provide a method includes: receiving, by a base station, a long DRX parameter sent by an RNC, where the long DRX parameter includes at least two of a cycle length of a long DRX cycle, a long DRX on length and a long DRX off length; determining, when the UE enters the CELL-FACH state, by the base station, and according to a first timer and a first preset duration corresponding to the first timer, that the UE enters the long DRX cycle; and determining, when the UE enters the long DRX cycle, by the base station, and according to the H-RNTI of the UE, the cycle length of the long DRX cycle and the long DRX on length, a radio subframe on which long DRX on of the UE is in the long DRX cycle.

34 Claims, 4 Drawing Sheets

(56) References Cited

U.S. PATENT DOCUMENTS

| | | |
|---|---|---|
| 2010/0278128 A1 | 11/2010 | Lee et al. |
| 2011/0081928 A1 | 4/2011 | Chen et al. |
| 2011/0199910 A1* | 8/2011 | Oh .................. H04W 52/0229 |
| | | 370/241 |
| 2013/0137432 A1* | 5/2013 | Wong .................. H04W 60/04 |
| | | 455/436 |
| 2014/0119255 A1* | 5/2014 | Vannithamby ......... H04B 15/00 |
| | | 370/311 |

FOREIGN PATENT DOCUMENTS

| | | |
|---|---|---|
| WO | WO 2010015669 A2 | 2/2010 |
| WO | WO 2011102644 A2 | 8/2011 |
| WO | WO 2012000547 A1 | 1/2012 |

OTHER PUBLICATIONS

"Handling of UL Data in DRX," TSG-RAN WG2 Meeting #61, Sorrento, Italy, R2-080935, $3^{rd}$ Generation Partnership Project, Valbonne, France (Feb. 11-15, 2008).

"$3^{rd}$ Generation Partnership Project; Technical Specification Group Radio Access Network; Radio Resource Control (RRC); Protocol specification (Release 11)," 3GPP TS 25.331, V11.0.0, pp. 1-1910, $3^{rd}$ Generation Partnership Project, Valbonne, France (Dec. 2011).

\* cited by examiner

RADIO DATA COMMUNICATION METHOD, BASE STATION, AND USER EQUIPMENT

CROSS-REFERENCE TO RELATED APPLICATION

This application is a continuation of International Patent Application No. PCT/CN2013/070754, filed on Jan. 21, 2013, which claims priority to Chinese Patent Application No. 201210017449.X, filed on Jan. 19, 2012, and Chinese Patent Application No. 201210360759.1, filed on Sep. 25, 2012, all of which are hereby incorporated by reference in their entireties.

TECHNICAL FIELD

Embodiments of the present invention relate to the field of communications technologies, and in particular, to a radio data communication method, base station, and user equipment.

BACKGROUND

The cell-forward access channel (CELL-Forward Access Channel, CELL_FACH) state is a state of a user equipment (User Equipment, UE) in a universal mobile telecommunications system (Universal Mobile Telecommunications System, UMTS).

To save energy consumption of a UE, a UE in CELL-FACH state has a discontinuous reception (Discontinuous Reception, DRX) mechanism. The minimum length of a time period during which data can be received (Discontinuous Reception-on, DRX on) within a DRX cycle (cycle) is 10 ms (that is, the length of one radio frame), and the maximum DRX cycle length is 320 ms (that is, the length of 32 radio frames). The DRX cycle length and the DRX on length are configured for a UE by a radio network controller (Radio Network Controller, RNC) through a system message, and are configured for a base station (for example, a NodeB) through common signaling at the same time. DRX-on timing is calculated by a UE and a NodeB through a high speed downlink shared channel-radio network temporary identifier (High Speed Downlink Shared Channel-Radio Network Temporary Identifier, H-RNTI) of the UE, the DRX cycle length, and the DRX_on length, respectively, which is as follows: (SFN-H-RNTI+65536) mod DRX_cycle<DRX_on. The value of a system frame number (System Frame Number, SFN) is 0~4095, one SFN denotes 10 ms, the value of the DRX_cycle length can be 4, 8, 16 or 32 radio frames, the value of the DRX_on length can be 1, 2, 4, 8 or 16 radio frames, and the length of one radio frame is 10 ms. For a NodeB, when a T321 timer expires, data can be sent to the UE only in the case that the SFN meets the foregoing inequality. Correspondingly, for the UE, when the T321 timer expires, downlink data can be received only in the case that the SFN meets the foregoing inequality.

To further save the energy consumption of the UE, s shorter DRX-On length can further be set. For example, the DRX-On length may be set to 2 ms. In this case, one DRX cycle with the length of 10 ms includes 5 radio subframes. During the implementation of the present invention, the inventor finds that the prior art has at least the following disadvantages: when the foregoing solutions in the prior art are adopted, it cannot be accurately determined on which radio subframe DRX-on specifically is, resulting in low data processing efficiency.

SUMMARY

Embodiments of the present invention provide a radio data communication method, base station, and user equipment, so as to solve a defect in the prior art that when a shorter DRX-On length is set, it cannot be accurately determined which radio subframe the DRX-on specifically is on, resulting in low data processing efficiency.

An embodiment of the present invention provides a radio data communication method, including:

receiving, by a base station, a long discontinuous reception parameter sent by a radio network controller, where the long discontinuous reception parameter includes at least two of a cycle length of a long discontinuous reception cycle, a length of receiving data in the long discontinuous reception cycle, and a length of not receiving data in the long discontinuous reception cycle;

determining, when a user equipment enters a cell-forward access channel state, by the base station, and according to a first timer and a first preset duration corresponding to the first timer, that the user equipment enters the long discontinuous reception cycle; and determining, when the user equipment enters the long discontinuous reception cycle, by the base station, and according to a high speed downlink shared channel-radio network temporary identifier of the user equipment, the cycle length of the long discontinuous reception cycle, and the length of receiving data in the long discontinuous reception cycle, a radio subframe and/or a radio frame on which the user equipment receives data in the long discontinuous reception cycle.

An embodiment of the present invention further provides a radio data communication method, including:

receiving, by a user equipment, a long discontinuous reception parameter sent by a radio network controller, where the long discontinuous reception parameter includes at least two of a cycle length of a long discontinuous reception cycle, a length of receiving data in the long discontinuous reception cycle, and a length of not receiving data in the long discontinuous reception cycle;

determining, when the user equipment enters a cell-forward access channel state, and according to a first timer and a first preset duration corresponding to the first timer, that the user equipment enters the long discontinuous reception cycle; and determining, when the user equipment enters the long discontinuous reception cycle, by the user equipment, and according to a high speed downlink shared channel-radio network temporary identifier of the user equipment, the cycle length of the long discontinuous reception cycle, and the length of receiving data in the long discontinuous reception cycle, a radio subframe and/or a radio frame on which data is received in the long discontinuous reception cycle.

An embodiment of the present invention provides a base station, including:

a receiving module, configured to receive a long discontinuous reception parameter sent by a radio network controller, where the long discontinuous reception parameter includes at least two of a cycle length of a long discontinuous reception cycle, a length of receiving data in the long discontinuous reception cycle, and a length of not receiving data in the long discontinuous reception cycle;

a first determination module, configured to determine, when a user equipment enters a cell-forward access channel state, and according to a first timer and a first preset duration corresponding to the first timer, that the user equipment enters the long discontinuous reception cycle; and a second determination module, configured to determine, when the user equipment enters the long discontinuous reception cycle, and according to a high speed downlink shared channel-radio network temporary identifier of the user equipment, the cycle length of the long discontinuous reception cycle, and the length of receiving data in the long discontinuous reception cycle, a radio subframe and/or a radio frame on which the user equipment receives data in the long discontinuous reception cycle.

An embodiment of the present invention further provides a user equipment, including:

a receiving module, configured to receive a long discontinuous reception parameter sent by a radio network controller, where the long discontinuous reception parameter includes at least two of a cycle length of a long discontinuous reception cycle, a length of receiving data in the long discontinuous reception cycle, and a length of not receiving data in the long discontinuous reception cycle;

a first determination module, configured to determine, when the user equipment enters a cell-forward access channel state, and according to a first timer and a first preset duration corresponding to the first timer, that the user equipment enters the long discontinuous reception cycle; and a second determination module, configured to determine, when the user equipment enters the long discontinuous reception cycle, and according to a high speed downlink shared channel-radio network temporary identifier of the user equipment, the cycle length of the long discontinuous reception cycle, and the length of receiving data in the long discontinuous reception cycle, a radio subframe and/or a radio frame on which data is received in the long discontinuous reception cycle.

The embodiments of the present invention provide a data processing method, a base station, and a user equipment. By adopting the foregoing technical solutions, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, when the technical solutions in the embodiments of the present invention are adopted, a radio subframe on which the DRX-On is can be accurately determined, so as to effectively enhance the data processing efficiency.

BRIEF DESCRIPTION OF DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of the present invention more comprehensible, the technical solutions according to embodiments of the present invention are clearly described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

In a universal mobile telecommunications system (Universal Mobile Telecommunications System, UMTS), a user equipment (User Equipment, UE) has five states, namely, a cell-dedicated channel (CELL-Dedicated Channel, CELL_DCH) state, a cell-forward access channel (CELL-Forward Access Channel, CELL_FACH) state, a cell-paging channel (CELL-Paging Channel, CELL_PCH) state, a UMTS terrestrial radio access network registration area_paging channel (UMTS Terrestrial Radio Access Network (UTRAN) Registration Area_Paging Channel, URA_PCH) state, and an IDLE (idle) state. A radio network controller (Radio network controller, RNC) instructs a UE through a radio resource control (Radio Resource Control, RRC) message to transit to a state, for example, instructs a UE to transit to the CELL_FACH state or CELL_PCH state. A UE has different power consumption performance in a different state. For the five states, the decreasing order of power saving performance is: IDLE state>URA_PCH>CELL_PCH>CELL_FACH>CELL_DCH. That is, the IDLE state is most power saving and CELL-DCH is most power consuming.

After a UE in the CELL_FACH state monitors its own high speed downlink shared channel-radio network temporary identifier (High Speed Downlink Shared Channel-Radio Network Temporary Identifier, H-RNTI) on a high speed-shared control channel (High Speed-Shared Control Channel, HS-SCCH), the UE restarts a T321 timer. After the T321 timer expires, the UE enters a DRX cycle. After the UE wins a common enhanced-dedicated channel (common Enhanced-Dedicated channel, common E-DCH) resource, the UE stops the T321 timer and exits DRX cycle mode. The DRX cycle length and the DRX on length are configured for a UE by a radio network controller (Radio Network Controller, RNC) through a system message, and are configured for a base station (for example, NodeB) through common signaling at the same time.

Figure 1:
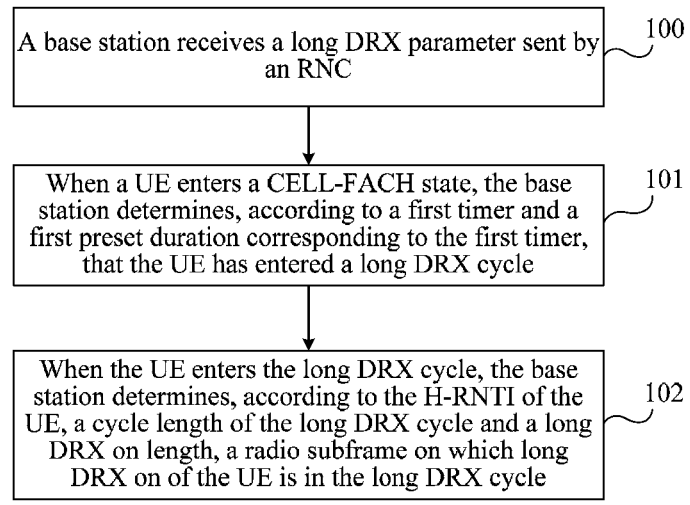
FIG. 1 is a flow chart of a radio data communication method according to an embodiment of the present invention.

FIG. 1 is a flow chart of a radio data communication method according to an embodiment of the present invention. As shown in FIG. 1, a base station executes the radio data communication method in this embodiment. The radio data communication method in this embodiment may specifically include the following:

100. A base station receives a long (long) DRX parameter sent by an RNC.

In this embodiment, long DRX has a longer DRX on length compared with ordinary DRX in the prior art, that is, has shorter DRX off, and/or further may have a longer DRX cycle length. In this way, existing DRX can be referred to as short DRX. Similar with short DRX, long DRX on is a time period of receiving data in a long DRX cycle, long DRX off is a time period of not receiving data in a long DRX cycle, that is, a first preset duration of a first timer when a UE is controlled to enter the long DRX cycle.

The long DRX parameter in this embodiment includes at least two of a cycle length of a long DRX cycle, a long DRX on length, and a length of not receiving data (that is, long DRX off) in the long DRX cycle. The cycle length of the long DRX cycle equals the long DRX on length plus the long DRX off length, and one of the three can be calculated from the rest two.

For example, for a cell level UE (that is, a case where all UEs in a cell have the same long DRX parameter), an RNC can configure a long DRX parameter for a NodeB through a physical shared channel reconfiguration message (PHYSICAL SHARED CHANNEL RECONFIGURATION REQUEST), or for a single UE, the RNC can configure a long DRX parameter for the base station through a Frame Protocol (Frame Protocol, FP) frame.

In one implementation scenario in an embodiment of the present invention, the DRX parameter in this embodiment is a DRX parameter configured for a single UE or a cell level UE by an RNC according to a CELL-FACH state of the UE. Alternatively, a UE may further report a service type to an RNC, and the RNC configures a corresponding DRX parameter for the UE according to the service type reported by the UE. Alternatively, an RNC may further take statistics of service models of a UE and then obtain a DRX parameter for the UE according to the statistical result. In practical applications, a DRX parameter may be further set according to specific practical cases.

101. When a UE enters the CELL-FACH state, the base station determines, according to a first timer and a first preset duration corresponding to the first timer, that the UE enters a long DRX cycle.

The first preset duration corresponding to the first timer may be predefined by a UE, a base station and an RNC. Alternatively, an RNC may further predefine the first preset duration, and the long DRX parameter sent by the RNC to the base station in 100 carries the first preset duration. The first preset duration is an expiry time of the first timer and is used to control the UE to enter the long DRX cycle.

102. When the UE enters the long DRX cycle, the base station determines, according to the H-RNTI of the UE, a cycle length of the long DRX cycle and a long DRX on length, a radio subframe on which long DRX on of the UE is in the long DRX cycle.

For the radio data communication method provided in this embodiment, by adopting the foregoing technical solution, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

For a NodeB in the prior art, if a long DRX on is set too short, for example, 2 ms, one radio frame includes a plurality of radio subframes, for example, 5 radio subframes. When the NodeB schedules a plurality of UEs, a plurality of UEs might fall on one same radio subframe, causing that the NodeB fails scheduling, which lowers scheduling efficiency. By adopting the technical solution in this embodiment, radio subframes in the radio frame on which long DRX on of each UE is can be accurately calculated, so that during the setting of long DRX on, the radio subframes in the radio frame on which long DRX on where a plurality of UEs falls may be set separately to the maximum degree, so as to effectively reduce the number of UEs that falls in long DRX on that are on one same radio subframe, thereby enhancing the scheduling efficiency of the NodeB.

It should be noted that, a premise for the embodiment shown in FIG. 1 is that the base station has a capability of supporting long DRX. Therefore, before 100 in the embodiment, it may be further included that: the base station reports to the RNC a capability indication of whether the long DRX is supported. For example, a capability indication of whether a base station or a cell or a local cell corresponding to the base station supports the long DRX may be reported through an audit response message (AUDIT RESPONSE) or a resource status indication (RESOURCE STATUS INDICATION).

Optionally, on the basis of the embodiment shown in FIG. 1, after 102 in the embodiment shown in FIG. 1, the following step may be further included: the base station schedules the data of the UE on the radio subframe on which long DRX on is in the long DRX cycle.

Optionally, on the basis of the embodiment shown in FIG. 1, 101, "when a UE enters the CELL-FACH state, the base station determines, according to a first timer and a first preset duration corresponding to the first timer, that the UE enters a long DRX cycle" may specifically include the following:

(1) When the UE enters the CELL-FACH state, the base station allocates no common E-DCH resource to the UE, and the base station sends the H-RNTI of the UE on the HS-SCCH, the base station starts or restarts a first timer. Alternatively, when the base station allocates no common E-DCH resource to the UE, and "DRX Interruption by HS-DSCH data" (that is, an indication of whether high speed downlink shared channel (High Speed Downlink Shared Channel, HS-DSCH) data can interrupt a DRX operation) is TRUE, and the base station sends the H-RNTI of the UE on the HS-SCCH, the base station starts or restarts the first timer. Also, the first timer can expire when running till the first preset duration is up. The first preset duration may be predefined by the UE, the base station and the RNC before communications, or is carried by the RNC in the long DRX parameter and informed to the base station and UE. The "DRX Interruption by HS-DSCH data" is configurable, which may be set to TRUE or False. TRUE denotes that HS-DSCH data can interrupt a DRX operation, that is, after sending the H-RNTI of the UE on the HS-SCCH, the base station starts or restarts the first timer. When the value is false, it denotes that when sending the H-RNTI of the UE on the HS-SCCH, the base station does not restart the first timer.

(2) In a process that the first timer starts and runs in the first preset duration, the base station allocates a common E-DCH resource to the UE, and then the base station stops the first timer and can send data to the UE on the HS-DSCH continuously. When releasing the common-DCH resource of the UE, the UE starts or restarts the first timer.

(3) When the base station has detected that the first timer starts and runs till the first preset duration is up, and the first timer expires, the base station determines that the UE enters the long DRX cycle.

Further, optionally, on the basis of the embodiments, before or while "when the UE enters the CELL-FACH state, the base station allocates no common E-DCH resource to the UE, and the base station sends the H-RNTI of the UE on the HS-SCCH, the base station starts or restarts the first timer", it may be further included in the following that:

(a) The base station starts or restarts the second timer and a second preset duration is set on the second timer. When the first timer and the second timer start at the same time, it is required that the second preset duration is shorter than the first preset duration. The same as the first preset duration, the second preset duration may also be predefined for the UE, the base station, and the RNC. Alternatively, the second preset duration may be further predefined by the RNC and the RNC sends the second preset duration to the base station.

(b) When the base station has detected that the second timer starts and runs till the second preset duration is up, and the second timer expires, the base station determines that the UE enters the short DRX cycle.

For example, the second timer may be a T321 timer in the prior art. Specifically, after the T321 timer expires, it may be set that the UE transits to a long DRX cycle after n continuous short DRX cycles, where n is configurable or is predefined in the protocol. For example, one default value is 1, that is, when the T321 timer expires, after one short DRX, the UE enters the long DRX. Further optionally, in a process that the second timer starts and runs in the second preset duration, the base station allocates a common E-DCH to the UE, and then the base station stops the second timer, and can continuously send data to the UE on the HS-DSCH.

For example, in the following, the technical solution of the present invention is introduced by taking an example in which step (a) and step (b) are executed before the base station starts or restarts the first timer after the UE enters the CELL-FACH state, the base station allocates no common E-DCH resource to the UE, and the base station has send the H-RNTI of the UE on the HS-SCCH.

For a base station, after a UE enters the CELL_FACH state and when the base station allocates no common E-DCH resource to the UE and sends the H-RNTI of the UE on the HS-SCCH, the base station starts or restarts a T321 timer (that is, the second timer). Alternatively, the base station allocates no common E-DCH resource to the UE, and "DRX Interruption by HS-DSCH data" (that is, an indication of whether HS-DSCH data interrupts a DRX operation) is TRUE, so that when sending the H-RNTI of the UE on the HS-SCCH, the base station starts or restarts T321. Alternatively, after the base station releases the common E-DCH resource of the UE, the base station starts or restarts T321. When T321 runs, after the base station allocates a common E-DCH resource to the UE, the base station stops the T321 timer and can continuously send data to the UE on the HS-DSCH. After releasing the common E-DCH resource, the UE starts or restarts the T321 timer. When the T321 timer expires (that is, the second timer starts and runs till the second preset duration is up), the UE enters the Short DRX cycle and at the same time starts the first timer T. After the first timer T expires (that is, the first timer starts and runs till the first preset duration is up), the UE enters the long DRX cycle. When the first timer T runs, the base station sends the H-RNTI of the UE on the HS-SCCH or the base station allocates a common E-DCH resource to the UE, and stops the first timer T. After the first timer T expires, the base station determines that the UE enters the long DRX cycle.

In the foregoing solution, the base station starts or restarts the second timer before starting or restarting the first timer. Specifically, it may be that the base station starts or restarts the first timer after the second timer expires, or that the base station starts or restarts the first timer after the second timer expires and when the UE enters short DRX on.

Optionally, on the basis of the embodiment shown in FIG. 1, 102 that "when the UE enters the long DRX cycle, the base station determines, according to the H-RNTI of the UE, a cycle length of the long DRX cycle and a long DRX on length, a radio subframe on which long DRX on of the UE is in the long DRX cycle" may specifically include the following several optional manners:

First Optional Manner

Step (a): When the UE enters the long DRX cycle, the base station determines a radio subframe on which long DRX on of the UE is in the long DRX cycle according to the following formula:

$$(Sub\_frame\_num-H\text{-}RNTI+65536) \bmod DRX\_Cycle\_Length < DRX\_On\_Length$$

where Sub_frame_num denotes a number of a radio subframe on which long DRX on is in the long DRX cycle, H-RNTI is the H-RNTI of the UE, DRX_Cycle_Length is the cycle length of the long DRX cycle, DRX_On_Length is the long DRX on length; mod denotes modulo; and both the cycle length of the long DRX cycle and the long DRX on length take the length of one radio subframe as a unit. Specifically, both the cycle length of the long DRX cycle and the long DRX on length are the number of radio subframes, and the value range of Sub_frame_num is 0~4096*5−1.

The first optional manner may further optionally include the implementation process of step (b):

According to the obtained radio subframe on which the user equipment receives data in the long discontinuous reception cycle, a corresponding radio frame and radio subframes in the radio frame are determined. For example, it is specifically included that: radio frame=Sub_frame_num div M; and radio subframe in the radio frame=Sub_frame_num mod M, where M denotes the number of radio subframes included in one radio frame, div denotes division, and mod denotes modulo.

For example, according to the obtained radio subframes, the radio frame and corresponding radio subframes on which the user receives data in the discontinuous reception cycle are further determined. For example, Sub_frame_num div M denotes a number of a corresponding radio frame, Sub_frame_num mod M is a number of a corresponding radio subframe, where M denotes the number of radio subframes included in one radio frame, and the default is 5. In a specific example of the method, for example, according to the obtained radio subframe numbers 0, 1, 2, 3, 4, 5, and 6, it denotes that the UE can receive data on the radio subframes No. 0 and No. 1 of the entire radio frames No. 0 and No. 1.

Second Optional Manner (a) When the UE enters the long DRX cycle, the base station determines a start subframe of a radio subframe on which long DRX on of the UE is in the long DRX cycle according to the following formula:

$$\text{start-Sub\_frame\_num} = H\text{-}RNTI \bmod DRX\_Cycle\_Length + n*DRX\_Cycle\_Length;$$

where n is 0 or a positive integer, start-Sub_frame_num denotes a number of a start radio subframe of a radio subframe on which long DRX on is in the long DRX cycle; start-Sub_frame_num is not greater than a maximum subframe number (4096*5−1); and mod denotes modulo.

The base station determines, according to the start subframe of the radio subframe on which long DRX on of the UE is in the long DRX cycle and the long DRX on length, a radio subframe on which long DRX on of the UE is in the long DRX cycle. For example, it is determined according to the foregoing formula that the radio subframe No. 0 is the start subframe of long DRX on, and the long DRX on length is 2, so that the radio subframes No. 1 and No. 2 are where long DRX on of the UE is. Both the cycle length of the long DRX cycle and the long DRX on length take the length of one radio subframe as a unit. Specifically, both the cycle length of the long DRX cycle and the long DRX on length are the number of radio subframes.

The second optional manner further optionally includes step (b):

A corresponding radio frame and radio subframes in the radio frame are determined according to the obtained radio subframe on which the user equipment receives data in the long discontinuous reception cycle. For example, it is specifically included that: radio frame=Sub_frame_num div M; and radio subframe in the radio frame=Sub_frame_num mod M, where M denotes the number of radio subframes included in one radio frame, div denotes division, and mod denotes modulo.

In step (b), according to a number of the radio subframe obtained in the foregoing manner, the corresponding radio frame and radio subframe are further calculated. For example, Sub_frame_num div M denotes a number of the corresponding radio frame and Sub_frame_num mod M is a number of the corresponding radio subframe, where M denotes the number of radio subframes included in one radio frame, and the default is 5. In a specific method example, for example, Sub_frame_num mod is 6, so that the user can receive data at the time point of the subframe number 1 of the radio frame No. 1 in the discontinuous reception cycle.

The manner of defining a radio subframe in step (a) in the first and second optional manners is as follows: each radio frame includes 5 radio subframes, the radio frame is numbered by an SFN, and its value is 0, 1, 2, . . . , and 4095, so that the corresponding subframes are SFN*5, SFN*5+1, SFN*5+2, SFN*5+3, and SFN*5+4. For example, SFN=0, the numbers of the corresponding radio subframes are 0, 1, 2, 3, and 4, and when SFN=1, the numbers of the corresponding radio subframes are 5, 6, 7, 8, and 9.

The manner of defining the radio subframe in step (b) in the first and second optional manners is as follows: each radio frame includes 5 radio subframes, the radio frame is numbered by an SFN, and its value is 0, 1, 2, . . . , 4095. However, all radio subframes in the radio frame are numbered as 0, 1, 2, 3, and 4, or numbered as 1, 2, 3, 4, and 5.

The third optional manner is that the base station determines, according to the high speed downlink shared channel-radio network temporary identifier of the user equipment, the cycle length of the long discontinuous reception cycle, and the length of receiving data in the long discontinuous reception cycle, the radio frame and the radio subframe on which the user equipment receives data in the long discontinuous reception cycle, which includes:

When the user equipment enters the long discontinuous reception cycle, the base station determines the radio frame and the radio subframe on which the user equipment receives data in the long discontinuous reception cycle according to the following formula:

$$(N*SFN+Sub\_frame\_num-H-RNTI+65536) \bmod DRX\_Cycle\_Length < DRX\_On\_Length;$$

where N denotes the number of radio subframes included in one radio frame, the default value of which is 5, SFN denotes a number of a system frame on which data is received in the long discontinuous reception cycle, and is denoted by the radio frame, Sub_frame_num denotes a number of the radio subframe on which data is received in the long discontinuous reception cycle, which can be 0, 1, 2, 3, 4 or (1, 2, 3, 4, 5), H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

In a fourth optional manner when the user equipment enters the long discontinuous reception cycle, the base station determines the radio frame and a start subframe of the subframe on which the user equipment receives data in the long discontinuous reception cycle according to the following formula:

$$SFN*M+start-Sub\_frame\_num=H-RNTI \bmod DRX\_Cycle\_Length+n*DRX\_Cycle\_Length;$$

where M denotes the number of radio subframes included in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo.

The base station determines, according to the radio frame and the start subframe of the radio subframe on which the user equipment receives data in the long discontinuous reception cycle and the length of receiving data in the long discontinuous reception cycle, the radio subframe on which the user equipment receives data in the long discontinuous reception cycle. The cycle length of the long discontinuous reception cycle and the length of receiving data in the long discontinuous reception cycle are denoted by the number of the radio subframes. For example, it is determined according to the foregoing formula that the radio frame number is 0, the subframe number is 1, and the length of receiving data in the long discontinuous reception cycle is 2, so that it can be determined that when the UE is in discontinuous reception state, downlink data can be received in the subframes No. 1 and No. 2 of the radio frame No. 0.

The fifth optional manner can include following two steps:

(i) When the UE enters the long DRX cycle, the base station determines, according to the H-RNTI of the UE and the cycle length of the long DRX cycle, the radio frame on which long DRX on of the UE is in the long DRX cycle; where the cycle length of the long DRX cycle takes the length of one radio frame as a unit; and specifically, the cycle length of the long DRX cycle is the number of radio frames.

(ii) The base station determines the radio subframe in the radio frame on which long DRX on of the UE is in the long DRX cycle.

Optionally, step (i) in the foregoing third optional manner may specifically include the following several optional manners:

First optional manner: The base station determines, according to the H-RNTI of the UE and the cycle length of the long DRX cycle, the radio frame on which long DRX on of the UE is in the long DRX cycle, by adopting the following formula:

$$(SFN\text{-}H\text{-}RNTI+65536) \bmod DRX\_Cycle\_Length < 1;$$

where SFN denotes a number of the radio frame or system frame on which long DRX on of the UE is in the long DRX cycle, H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is the number of radio frames.

Second optional manner: The base station determines, according to the H-RNTI of the UE and the cycle length of the long DRX cycle, the radio frame on which long DRX on of the UE is in the long DRX cycle, by adopting the following formula:

$$SFN = H\text{-}RNTI \bmod DRX\_Cycle\_Length + n*DRX\_Cycle\_Length;$$

where SFN denotes the radio frame on which long DRX on of the UE is in the long DRX cycle, n is 0 or a positive integer; H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is the number of radio frames.

Step (i) adopts either the first optional manner or the second optional manner. Correspondingly, in step (ii), the base station determines the radio subframe in the radio frame on which long DRX on of the UE is in the long DRX cycle, and can also specifically adopt the following optional manners, respectively:

Optional manner a: The base station determines, according to the H-RNTI of the UE, the number of radio subframes included in the radio frame on which the long DRX on is in the long DRX cycle, and the cycle length of the long DRX cycle, a number of the radio subframe in the radio frame on which long DRX on of the UE is in the long DRX cycle, by adopting the following formula:

$$Sub\text{-}frame\text{-}number = floor(H\text{-}RNTI \text{ div } DRX\_Cycle\_Length) \bmod N$$

where Sub-frame-number denotes a radio subframe number, floor denotes rounding down to a nearest integer; N denotes the number of radio subframes included in one radio frame, for example, the value of N is 5, denoting that one radio frame includes 5 radio subframes, and the subframes are accordingly numbered as 0, 1, 2, 3, and 4; div denotes division, H-RNTI is the H-RNTI of the UE, DRX_Cycle_Length is the cycle length of the long DRX cycle; and mod denotes modulo.

Optional manner b: The base station determines, according to the H-RNTI of the UE and the number of radio subframes included in the radio frame on which the long DRX on is in the long DRX cycle, a number of the radio subframe in the radio frame on which long DRX on of the UE is in the long DRX cycle, by adopting the following formula:

$$Sub\text{-}frame\text{-}number = H\text{-}RNTI \bmod N;$$

where Sub-frame-number denotes a number of the radio subframe in the radio frame on which long DRX on of the UE is in the long DRX cycle, N denotes the number of radio subframes included in one radio frame, for example, the value of N is 5, denoting that one radio frame includes 5 radio subframes, and the subframes are accordingly numbered as 0, 1, 2, 3, and 4; div denotes division, H-RNTI is the H-RNTI of the UE, DRX_Cycle_Length is the cycle length of the long DRX cycle; and mod denotes modulo.

Optional manner c: The base station receives a number of the radio subframe in the radio frame on which long DRX on of the UE is in the long DRX cycle sent by the RNC, for example, sub-frame0, sub-frame1, sub-frame2, sub-frame3, and sub-frame4, where the radio subframes are configured by the RNC. For example, the RNC configure the radio subframe on which long DRX on is. For example, the RNC configures a radio subframe corresponding to long DRX on through a dedicated RRC message. Correspondingly, the RNC delivers to the base station the radio subframe corresponding to long DRX on of the UE through an FP frame.

When the UE is in the long DRX cycle, the UE can only receive downlink data on the radio subframe whose sequence number is configured by the RNC in the radio frame determined in step (i). Correspondingly, the NodeB can only send the downlink data of the UE on the radio subframe configured by the RNC in the radio frame determined in step (i). That is, for example, when the radio frame determined in step (i) is radio frame 0 and a number of the radio subframe configured by the RNC is 1, the UE can only receive downlink data on the subframe No. 1 of the radio frame 0.

Optionally, step (i) in the foregoing third optional manner may specifically further include the following optional manner:

Third optional manner Determine, according to the H-RNTI of the UE and the cycle length of the long DRX cycle, the radio frame on which long DRX on of the UE is in the long DRX cycle, by adopting the following formula:

$$(SFN\text{-}H\text{-}RNTI+65536) \bmod DRX\_Cycle\_Length < DRX\_On\_Length;$$

where SFN denotes a number of the radio frame or a number of the system frame on which long DRX on of the UE is in the long DRX cycle; H-RNTI is the H-RNTI of the UE, DRX_Cycle_Length is the cycle length of the long DRX cycle, DRX_On_Length is the long DRX on length, mod denotes modulo; and both the cycle length of the long DRX cycle and the long DRX on length take the length of one radio frame as a unit. Specifically, in the case of not making an integral number of radio frames, DRX_On_Length is rounded up to a nearest integer or can be denoted with a decimal fraction. For example, the DRX_On_Length is 6 radio subframes (one radio frame includes 5 radio subframes), so the DRX on length in the foregoing formula is 2 or 1.2. SFN denotes a number of the system frame, that is, the radio frame, and specifically the value range can be 0~4095.

For foregoing step (i), the foregoing third optional manner can be adopted. Correspondingly, step (ii) that the base station determines the radio subframe in the radio frame on which long DRX on of the UE is in the long DRX cycle may specifically also adopt the foregoing optional manner c. That is, the base station receives a number of the radio subframe in the radio frame on which long DRX on of the UE is sent by the RNC. If the length of long DRX on has N subframes, a numbers of subframes are 0, 1, 2, . . . , and N−1, or may further include the following optional manner:

Optional manner d: The base station determines, according to the H-RNTI of the UE, the number of radio subframes included in the radio frame on which the long DRX on is in the long DRX cycle, and the cycle length of the long DRX cycle, the radio subframe in the radio frame on which long DRX on of the UE is in the long DRX cycle, by adopting the following formula:

(Sub-frame-number-H-RNTI+65536)mod($N$*Ceil[DRX_On_Length div $N$]))<DRX_On_Length;

where Sub-frame-number denotes a number of the radio subframe in the radio frame on which long DRX on of the UE is in the long DRX cycle, N denotes the number of radio subframes included in one radio frame; div denotes division, Ceil denotes rounding up to a nearest integer, H-RNTI is the H-RNTI of the UE; DRX_On_Length is the long DRX on length, and is denoted by the number of subframes, that is, the long DRX on length takes the length of one radio subframe as a unit; and mod denotes modulo. For example, the DRX on length is 6 radio subframes, N denotes the number of radio subframes included in one radio frame, and its value is 5. It is assumed that the value of the H-RNTI is 0, and according to the foregoing formula, the UE can receive downlink data on radio subframes 0, 1, 2, and 3. Here, a numbers of the radio subframes are numbered from the first subframe of the radio frame on which long DRX on is. For example, it is obtained through calculation according to step 1 that the radio frames corresponding to long DRX_On are 5 and 6, so that the first radio subframe is the subframe corresponding to radio frame 5 and is numbered 0, and the following sequence numbers are 1, 2, 3, . . . , and 9 (9 corresponds to a number of the last subframe of the radio frame 6).

Step (ii) that the base station determines the radio subframe in the radio frame on which long DRX on of the UE is in the long DRX cycle may further adopt the following manner e:

Optional manner e: The base station determines the radio subframe of the radio frame on which the user equipment receives data in the long discontinuous reception cycle, the specific implementation manner of which is:

(Sub_frame-H-RNTI+65536) mod 5<DRX_On_Length mod 5, where Sub_frame is 0, 1, 2, 3, 4, or
(Sub_frame-H-RNTI+65536) mod 5<DRX_On_Length mod 5+1, where Sub_frame is 1, 2, 3, 4, 5 where Sub_frame is a number of a radio subframe in the radio frame, H-RNTI is the high speed downlink shared channel-radio network temporary identifier of the user equipment, and DRX_On_Length is the length of receiving data in the long discontinuous reception cycle, and is denoted by the number of radio subframes.

Alternatively, based on a predefined manner, the radio subframe of the radio frame on which data is received in the long discontinuous reception cycle is determined, for example:

First N subframes of one radio frame are used as the radio subframes of the radio frame on which data is received in the long discontinuous reception cycle, where N=DRX_On_Length mod 5. For example, a numbers of radio frames determined in step (i) are 5 and 6, and the received data length of data reception in the long discontinuous data reception is 12 ms, so that it can be determined that the user receives data in the first subframe of the radio frame No. 5 and the radio frame No. 6 in the discontinuous reception cycle.

That is, a numbers of radio frames on which the user can receive data in the discontinuous reception cycle determined according to the method in step (i) are 5 and 6, and a numbers of radio subframes determined according to step (i) are 1 and 2, so that it can be determined that the user receives data on subframes No. 1 and No. 2 corresponding to the radio frame No. 5 and the radio frame No. 6 in the discontinuous reception cycle.

It should be noted that, for the NodeB in the prior art, if the long DRX cycle is too long and the RNC cannot determine whether the UE enters DRX mode, the RNC might continuously send to the NodeB data of a UE that is in DRX, and the buffer memory of the NodeB is limited, which might cause that the NodeB does not have sufficient buffer memory to receive downlink data for a UE in a continuous reception state and also the chance of scheduling a UE in DRX state is missed, thereby lowering scheduling efficiency. The embodiments of the present invention may specifically solve the foregoing technical problems by adopting the following technical solutions on the basis of the foregoing technical solutions.

When a UE enters a long DRX cycle or at any time, a base station sends a flow control frame (or an E-DCH DATA FRAME or a RACH DATA FRAME) to an RNC, where the flow control frame carries a UE identifier list, a time period T, and the maximum amount of data sent within the time period T, so that the RNC controls, according to the time period T and the maximum amount of data sent within the time period T in the flow control frame, the amount of data sent to a UE corresponding to the UE identifier list. It should be noted that, the UE identifier list can carry one or a plurality of UE identifiers, the maximum amount of data sent within the time period can correspond to each UE or all UEs in the UE identifier list. That is, each UE corresponds to one time period and a maximum amount of sent data, or all UEs in the UE identifier list correspond to one time period and a maximum amount of sent data. The UE identifier can be an H-RNTI or an E-RNTI, and the like. The time period T and the data amount are optional. If the flow control frame does not include a time period and only includes a data amount, after receiving the flow control frame, the RNC regards that the flow control frame is always valid, unless a new flow control frame is received. Alternatively, the flow control frame includes a time period but does not include a data amount, so that after receiving a flow control frame, the RNC no longer sends the data of the UE identifier list within the time period. Alternatively, the flow control frame includes a data amount and a time period, so that after receiving the flow control frame, the RNC sends the data of the UE identifier list to the base station within the time period based on a specified data amount.

After receiving a flow control frame, within a time period T, an RNC can only send data of a UE to a base station based on a maximum amount of data sent within the time period T specified in the flow control frame. After the time period T, the RNC can continuously send downlink data of the UE to the NodeB or send data based on a common flow control frame. Optionally, the common flow control frame and one flow control frame or a group of flow control frames of the UE can be carried in one flow control frame and sent to the RNC. The common flow control frame and one flow control frame or a group of flow control frames of the UE can be sent in different flow control frames. For example, Table 1 in the following is an example that a common flow control frame and one flow control frame or a group of flow control frames of a UE are carried in one flow control frame. That is, an existing common flow control frame carries an example of a flow control frame in the embodiment of the present invention. The foregoing solution is also applicable to that a UE enters a short DRX cycle.

TABLE 1

| Spare bits 7-6 | Congestion Status | CmCH-PI |
|---|---|---|
| | Spare bits 7-3 | Max. MAC-d/c PDU Length |
| Maximum MAC-d/c PDU Length (cont) | | |
| HS-DSCH Credits | | |
| HS-DSCH Credits (cont) | | |
| HS-DSCH Interval | | |
| HS-DSCH Repetition Period | | |
| H-RNTI/H-RNTI List | | |
| Time period T and amount of data to send within time period T | | |
| Spare Extension | | |

Alternatively, a base station sends a flow control frame to an RNC. The flow control frame carries a UE identifier list and an indication that a UE in the UE identifier list enters or exits a long DRX cycle, so that the RNC controls, according to the indication that a UE in the UE identifier list enters or exits a long DRX cycle, the amount of data sent to a UE corresponding to the UE identifier list. It should be noted that the UE identifier list can carry one or a plurality of UE identifiers.

Specifically, when the UE enters short DRX or long DRX, the base station notifies the RNC through a flow control frame HS-DSCH Capacity Allocation that one UE or a group of UEs enters DRX. After exiting the long DRX cycle or the short DRX cycle, the UE notifies the RNC through a flow control frame HS-DSCH Capacity Allocation that one UE or a group of UEs exits DRX. The flow control frame HS-DSCH Capacity Allocation includes the identifier of one UE or a group of UEs (for example, the H-RNTI of a UE or an H-RNTI list of a group of UEs), and an identifier that the UE enters or exits DRX. Further optionally, the flow control frame may further include a time period T and the maximum amount of data sent within the time period T. If the flow control frame includes a time period T and the maximum amount of data sent within the time period T, after receiving the indication that the UE enters DRX, the RNC sends the data of the UE according to the flow control frame, and otherwise the RNC implements, according to an algorithm, sends a small amount of data in a limited manner or does not send data to the NodeB. After receiving the uplink data of the UE, for example, an enhanced-dedicated channel data frame (E-DCH DATA FRAME), or receiving a flow control frame indication that the UE exits DRX, the RNC can send the data of the UE to the NodeB continuously or send the data of the UE to the NodeB according to a common flow control frame.

Alternatively, the base station periodically sends a flow control frame to the RNC. The flow control frame carries a UE identifier list of entering the long DRX cycle in a current cycle, a time period T and the maximum amount of data sent within the time period T, so that the RNC controls, according to the time period T and the maximum amount of data sent within the time period T in the flow control frame, the amount of data sent to a UE corresponding to the UE identifier list.

Specifically, the base station periodically sends a flow control frame HS-DSCH Capacity Allocation to an RNC, where the flow control frame includes flow control over a UE that enters a CELL_FACH long DRX cycle or a UE that enters a CELL_FACH short DRX cycle in the cycle (that is, the time period T and the maximum amount of data sent within the time period T corresponding each UE) and flow control over a UE in a non-long DRX cycle. The HS-DSCH Capacity Allocation includes the identifier (H-RNTI) of a UE that enters a CELL_FACH long DRX cycle or a CELL_FACH short DRX cycle in the flow control sending cycle and the time period T and the maximum amount of data sent within the time period T.

Alternatively, on the basis of the foregoing technical solution, before the base station sends a flow control frame to an RNC, the RNC can first send a flow control request frame HS-DSCH Capacity Request to the NodeB, where the flow control frame request frame includes the identifier H-RNTI of one UE or the identifiers H-RNTIs of a group of UEs, and the data amount that is buffered by each UE. Upon reception, the NodeB indicates through HS-DSCH Capacity Allocation one or a group of maximum data amount that can be sent within a time. Alternatively, in the case of receiving uplink data of the UE, the NodeB feeds back, through an E-DCH DATA FRAME or a RACH DATA FRAME, the maximum data amount that the UE can send within a time.

The technical solutions in the foregoing embodiment are all technical solutions at the side of a base station. By adopting the foregoing technical solutions, when a shorter DRX-On length is set, the base station can accurately determine which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Figure 2:
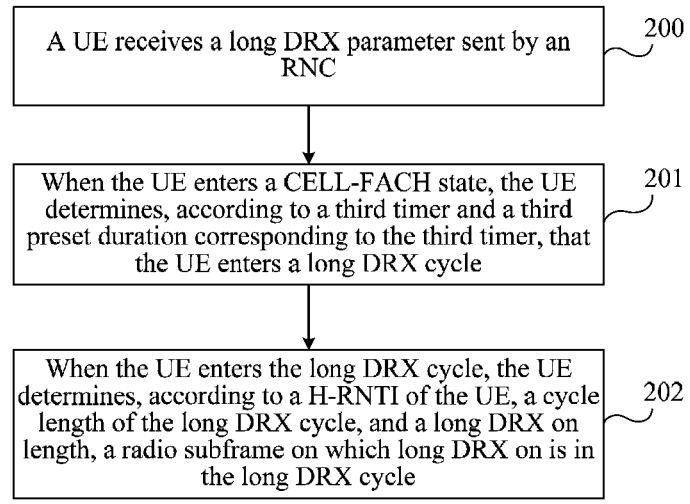
FIG. 2 is a flow chart of a radio data communication method according to another embodiment of the present invention.

FIG. 2 is a flow chart of a radio data communication method according to another embodiment of the present invention. As shown in FIG. 2, specifically a UE executes the radio data communication method in this embodiment. The radio data communication method in this embodiment may specifically include the following:

200. A UE receives a long DRX parameter sent by an RNC.

In this embodiment, the long DRX parameter includes at least two of a cycle length of a long DRX cycle, a long DRX on length, and a length of not receiving data (that is, long DRX off) in the long DRX cycle. The cycle length of the long DRX cycle equals a long DRX on length plus a long DRX off length. At this time, a third preset duration corresponding to a third timer may be predefined by a UE, a base station and an RNC. Alternatively, an RNC may further predefine the third preset duration, and the long DRX parameter sent by the RNC to the base station in 200 carries the third preset duration. The third preset duration is an expiry time of the third timer and is used to control the UE to enter the long DRX cycle. It should be noted that, the third timer this embodiment corresponds to, and can be identical to, the first timer in the embodiment on the side of a base station shown in FIG. 1. The third preset duration is the same as the first preset duration.

201. When the UE enters the CELL-FACH state, the UE determines, according to the third timer and the third preset duration corresponding to the third timer, that the UE enters the long DRX cycle.

202. When the UE enters the long DRX cycle, the UE determines, according to the H-RNTI of the UE, the cycle length of the long DRX cycle, and the long DRX on length, the radio subframe on which long DRX on is in the long DRX cycle.

The difference between this embodiment and the foregoing embodiment shown in FIG. 1 only lies in that: the technical solution of the present invention is described on the side of a base station in the foregoing embodiment shown in FIG. 1, whereas the technical solution of the present invention is described on the side of a UE in this embodiment. The details can also be referred to the records of the foregoing embodiment shown in FIG. 1, which are no longer elaborated here.

For the radio data communication method in this embodiment, by adopting the foregoing technical solutions, when a shorter DRX-On length is set, the base station can accurately determine which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

It should be noted that, the premise for the foregoing embodiment shown in FIG. 1 is that the UE has the capability of supporting long DRX. Therefore, before 200 in the foregoing embodiment, it may be further included that: the UE reports to the RNC a capability indication of whether a long DRX cycle is supported, for example, reports a capability indication of supporting a long DRX cycle through an RRC CONNECTION SETUP COMPLETE (RRC connection setup complete) message.

Optionally, on the basis of the foregoing embodiment shown in FIG. 2, after 202 in the foregoing embodiment shown in FIG. 2, it may be further included that: receiving data sent by the base station on the radio subframe on which long DRX on of the UE is in the long DRX cycle.

Optionally, on the basis of the embodiment shown in FIG. 1, 201 that "when the UE enters the CELL-FACH state, and according to the third timer and the third preset duration corresponding to the third timer, the UE determines that the UE enters the long DRX cycle" may specifically include the following:

(1) When the UE enters the CELL-FACH state and the UE does not occupy a common E-DCH resource, the UE starts or restarts, after monitoring its own H-RNTI on an HS-SCCH, a third timer. Alternatively, when the UE does not occupy a common E-DCH resource, and "DRX Interruption by HS-DSCH data" (that is, an indication of whether high speed downlink shared channel (High Speed Downlink Shared Channel, HS-DSCH) data can interrupt a DRX operation) is TRUE, and the UE starts or restarts, after monitoring its own H-RNTI on an HS-SCCH, the third timer. The "DRX Interruption by HS-DSCH data" is configurable, which may be set to TRUE or False. TRUE denotes that HS-DSCH data can interrupt a DRX operation, that is, after monitoring its own H-RNTI on an HS-SCCH, the UE starts or restarts the third timer. When the value is false, it denotes that when sending the H-RNTI of the UE on the HS-SCCH, the base station does not restart the third timer. Also, the third timer can expire when running till the third preset duration is up.

(2) In a process that the third timer starts and runs in the third preset duration, and when winning a common E-DCH resource allocated by the base station, the UE stops the third timer and can receive data sent by the base station on the HS-DSCH continuously. When releasing the common-DCH resource, the UE starts or restarts the third timer.

(3) When the UE has detected that the third timer starts and runs till the third preset duration is up, and the third timer expires, the UE enters the long DRX cycle.

Further, optionally, before or while that when the UE enters the CELL-FACH state and the UE does not occupy a common E-DCH resource, the UE starts or restarts, after monitoring its own H-RNTI on an HS-SCCH, a third timer, it may be further included in the following that:

(a) The UE starts a fourth timer and a fourth preset duration is set on the fourth timer. When the third timer and the fourth timer start at the same time, it is required that the fourth preset duration is shorter than the third preset duration. The fourth timer is identical to the second timer in the embodiment on the side of a base station, and the fourth preset duration is also identical to the second preset duration. Here, like the third preset duration, the fourth preset duration may also be predefined for the UE, the base station, and the RNC. Alternatively, the fourth preset duration may be further predefined by the RNC and the RNC sends the third preset duration to the UE.

(b) When the fourth timer starts and runs till the fourth preset duration is up, and the fourth timer expires, the UE enters the short DRX cycle.

The fourth timer in this embodiment may be identical to the second timer in the foregoing embodiment on the side of a base station. For example, the fourth timer can also be a T321 timer in the prior art. Specifically, when the T321 timer expires, it may be set that the UE transits to a long DRX cycle after n continuous short DRX cycles, where n is configurable or is predefined in the protocol. For example, one default value is 1, that is, when the T321 timer expires, after one short DRX, the UE enters the long DRX.

For example, in the following, the technical solution of the present invention is introduced by taking an example in which step (a) and step (b) are executed before that when the UE enters the CELL-FACH state and the UE does not occupy a common E-DCH resource, the UE starts or restarts, after monitoring its own H-RNTI on an HS-SCCH, a third timer.

For a UE, after a UE enters the CELL_FACH state and the UE does not occupy a common E-DCH resource, when monitoring its own H-RNTI on an HS-SCCH, the UE starts or restarts a T321 timer. Alternatively, the UE does not occupy a common E-DCH resource, "DRX Interruption by HS-DSCH data" (that is, an indication of whether HS-DSCH data interrupts a DRX operation) is TRUE, and the H-RNTI of the UE is sent on the HS-SCCH, the UE starts or restarts T321. Alternatively, after the UE releases the common E-DCH resource, the base station starts or restarts T321 timer. When T321 runs, after winning a common E-DCH resource, the UE stops the T321 timer, and can continuously receive data sent by the base station on the HS-DSCH. After releasing the common E-DCH resource, the UE starts or restarts the T321 timer. When the T321 timer expires, the UE enters the Short DRX cycle and at the same time starts the third timer T. When the third timer T expires, the UE enters the long DRX cycle. When the third timer T runs, when monitoring its H-RNTI on the HS-SCCH or wins a common E-DCH resource, the UE stops the timer T.

The "DRX Interruption by HS-DSCH data" is configurable, which may be set to TRUE or False. TRUE denotes that HS-DSCH data can interrupt a DRX operation, that is, after the UE has detected its own H-RNTI on an HS-SCCH, the UE starts or restarts the third timer. When the value is false, it denotes that when the UE has detected its own H-RNTI on the HS-SCCH, the UE does not restart the third timer.

In the foregoing solution, the UE starts or restarts the fourth timer before starting or restarting the third timer. Specifically, it may be that the UE starts or restarts the third timer after the fourth timer expires, or that the base station starts or restarts the third timer after the fourth timer expires and when the UE enters short DRX on.

Optionally, on the basis of the embodiment shown in FIG. 2, 202 that "when the UE enters the long DRX cycle, the UE determines, according to the H-RNTI of the UE, the cycle length of the long DRX cycle, and the long DRX on length, the radio subframe on which long DRX on is in the long DRX cycle" may specifically include the following several optional manners:

First Optional Manner

Step (a): When the UE enters the long DRX cycle, the UE determines a radio subframe on which long DRX on of the UE is in the long DRX cycle according to the following formula:

(Sub_frame_num-H-RNTI+65536)mod DRX_Cycle_Length<DRX_On_Length;

where Sub_frame_num denotes a number of a radio subframe on which long DRX on is in the long DRX cycle, H-RNTI is the H-RNTI of the UE, DRX_Cycle_Length is the cycle length of the long DRX cycle, DRX_On_Length is the long DRX on length; mod denotes modulo; and both the cycle length of the long DRX cycle and the long DRX on length take the length of one radio subframe as a unit. Specifically, both the cycle length of the long DRX cycle and the long DRX on length are denoted by the number of radio subframes.

The first optional manner may further optionally include the implementation process of step (b):

According to the obtained radio subframe on which the user equipment receives data in the long discontinuous reception cycle, a corresponding radio frame and radio subframes in the radio frame are determined. For example, it is specifically included that: radio frame=Sub_frame_num div M; and radio subframe in the radio frame=Sub_frame_num mod M, where M denotes the number of radio subframes included in one radio frame, div denotes division, and mod denotes modulo.

For example, according to the obtained radio subframes, the radio frame and corresponding radio subframes on which the user receives data in the discontinuous reception cycle are further determined. For example, Sub_frame_num div M denotes a number of a corresponding radio frame, Sub_frame_num mod M is a number of a corresponding radio subframe, where M denotes the number of radio subframes included in one radio frame, and the default is 5. In a specific example of the method, for example, according to the foregoing obtained radio subframe numbers 0, 1, 2, 3, 4, 5, and 6, it denotes that the UE can receive data on the radio subframes No. 0 and No. 1 of the entire radio frames No. 0 and No. 1.

Second Optional Manner (a) When the UE enters the long DRX cycle, the UE determines a start subframe of a radio subframe on which long DRX on of the UE is in the long DRX cycle according to the following formula:

start-Sub_frame_num=H-RNTI mod DRX_Cycle_Length+n*DRX_Cycle_Length;

where n is 0 or a positive integer, start-Sub_frame_num denotes a number of a start radio subframe of a radio subframe on which long DRX on is in the long DRX cycle; start-Sub_frame_num is not greater than a maximum subframe number (4096*5−1); and mod denotes modulo.

The UE determines, according to the start subframe of the radio subframe on which long DRX on of the UE is in the long DRX cycle and the long DRX on length, a radio subframe on which long DRX on of the UE is in the long DRX cycle. For example, it is determined according to the foregoing formula that the radio subframe No. 0 is the start subframe of long DRX on, and the long DRX on length is 2, so that the radio subframes No. 0 and No. 1 are where long DRX on of the UE is. Both the cycle length of the long DRX cycle and the long DRX on length take the length of one radio subframe as a unit. Specifically, both the cycle length of the long DRX cycle and the long DRX on length are the number of radio subframes.

The foregoing second optional manner further optionally includes step (b):

A corresponding radio frame and radio subframes in the radio frame are determined according to the obtained radio subframe on which the user equipment receives data in the long discontinuous reception cycle. For example, it is specifically included that: radio frame=Sub_frame_num div M; and radio subframe in the radio frame=Sub_frame_num mod M, where M denotes the number of radio subframes included in one radio frame, div denotes division, and mod denotes modulo.

In step (b), according to a number of the radio subframe obtained in the foregoing manner, the corresponding radio frame and radio subframe are further calculated. For example, Sub_frame_num div M denotes a number of the corresponding radio frame and Sub_frame_num mod M is a number of the corresponding radio subframe, where M denotes the number of radio subframes included in one radio frame, and the default is 5. In a specific method example, for example, Sub_frame_num mod is 6, so that the user can receive data at the time point of the subframe number 1 of the radio frame No. 1 in the discontinuous reception cycle.

The manner of defining the radio subframe in step (b) in the first and second optional manners is as follows: each radio frame includes 5 radio subframes, the radio frame is numbered by an SFN, and its value is 0, 1, 2, . . . , 4095. However, all radio subframes in the radio frame are numbered as 0, 1, 2, 3, and 4, or numbered as 1, 2, 3, 4, and 5.

The third optional manner is that the base station determines, according to the high speed downlink shared channel-radio network temporary identifier of the user equipment, the cycle length of the long discontinuous reception cycle, and the length of receiving data in the long discontinuous reception cycle, the radio frame and the radio subframe on which the user equipment receives data in the long discontinuous reception cycle, which includes:

when the user equipment enters the long discontinuous reception cycle, the base station determines the radio frame and the radio subframe on which the user equipment receives data in the long discontinuous reception cycle according to the following formula:

(N*SFN+Sub_frame_num-H-RNTI+65536)mod DRX_Cycle_Length<DRX_On_Length;

where N denotes the number of radio subframes included in one radio frame, the default value of which is 5, SFN denotes a number of a system frame on which data is received in the long discontinuous reception cycle, and is denoted by the radio frame, Sub_frame_num denotes a number of the radio subframe on which data is received in the long discontinuous reception cycle, which can be 0, 1, 2, 3, 4 or (1, 2, 3, 4, 5), H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

In a fourth optional manner when the user equipment enters the long discontinuous reception cycle, the base station determines the radio frame and a start subframe of the subframe on which the user equipment receives data in the long discontinuous reception cycle according to the following formula:

$$SFN*M+\text{start-Sub\_frame\_num}=H\text{-}RNTI \bmod DRX\_Cycle\_Length+n*DRX\_Cycle\_Length;$$

where M denotes the number of radio subframes included in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo.

The radio subframe on which the user equipment receives data in the long discontinuous reception cycle is determined according to the radio frame and the start subframe of the radio subframe on which the user equipment receives data in the long discontinuous reception cycle and the length of receiving data in the long discontinuous reception cycle. The cycle length of the long discontinuous reception cycle and the length of receiving data in the long discontinuous reception cycle are denoted by the number of the radio subframes. For example, it is determined according to the foregoing formula that the radio frame number is 0, the subframe number is 1, and the length of receiving data in the long discontinuous reception cycle is 2, so that it can be determined that when the UE is in discontinuous reception state, downlink data can be received in the subframes No. 1 and No. 2 of the radio frame No. 0.

The fifth optional manner can include following two steps:

(i) When the UE enters the long DRX cycle, the UE determines, according to the H-RNTI of the UE and the cycle length of the long DRX cycle, the radio frame on which long DRX on of the UE is in the long DRX cycle; where the cycle length of the long DRX cycle of the UE takes the length of one radio frame as a unit; and specifically, the cycle length of the long DRX cycle is denoted by the number of radio frames.

(ii) The UE determines the radio subframe in the radio frame on which long DRX on of the UE is in the long DRX cycle.

Optionally, step (i) in the foregoing third optional manner may specifically include the following several optional manners:

First optional manner: The UE determines, according to the H-RNTI of the UE and the cycle length of the long DRX cycle, the radio frame on which long DRX on of the UE is in the long DRX cycle, by adopting the following formula:

$$(SFN\text{-}H\text{-}RNTI+65536) \bmod DRX\_Cycle\_Length < 1;$$

where SFN denotes the radio frame on which long DRX on of the UE is in the long DRX cycle, H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is denoted by the number of radio frames.

Second optional manner: The UE determines, according to the H-RNTI of the UE and the cycle length of the long DRX cycle, the radio frame on which long DRX on of the UE is in the long DRX cycle, by adopting the following formula:

$$SFN = H\text{-}RNTI \bmod DRX\_Cycle\_Length + n*DRX\_Cycle\_Length;$$

where SFN denotes the radio frame on which long DRX on of the UE is in the long DRX cycle, n is 0 or a positive integer; H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is denoted by the number of radio frames.

Step (i) adopts either the first optional manner or the second optional manner. Correspondingly, in step (ii), the UE determines the radio subframe in the radio frame on which long DRX on of the UE is in the long DRX cycle, and can also specifically adopt the following optional manners, respectively:

Optional manner a: The UE determines, according to the H-RNTI of the UE, the number of radio subframes included in the radio frame on which the long DRX on is in the long DRX cycle, and the cycle length of the long DRX cycle, the radio subframe in the radio frame on which long DRX on of the UE is in the long DRX cycle by adopting the following formula:

$$\text{Sub-frame-number} = \text{floor}(H\text{-}RNTI \text{ div } DRX\_Cycle\_Length) \bmod N$$

where Sub-frame-number denotes a radio subframe number, for example, its value is 0, 1, 2, 3, and 4, floor denotes rounding down to a nearest integer; N denotes the number of radio subframes included in one radio frame, for example, one radio frame includes 5 radio subframes; div denotes division, H-RNTI is the H-RNTI of the UE, DRX_Cycle_Length is the cycle length of the long DRX cycle; and mod denotes modulo.

Optional manner b: The UE determines, according to the H-RNTI of the UE and the number of radio subframes included in the radio frame on which the long DRX on is in the long DRX cycle, the radio subframe in the radio frame on which long DRX on of the UE is in the long DRX cycle, by adopting the following formula:

$$\text{Sub-frame-number} = H\text{-}RNTI \bmod N;$$

where Sub-frame-number denotes a number of a radio subframe in a radio frame on which long DRX on of the UE is in the long DRX cycle; N denotes the number of radio subframes included in one radio frame; div denotes division, H-RNTI is the H-RNTI of the UE, DRX_Cycle_Length is the cycle length of the long DRX cycle; and mod denotes modulo.

Optional manner c: The UE receives the identifier corresponding to the radio subframe in the radio frame on which long DRX on of the UE is in the long DRX cycle sent by the RNC, and the radio subframe is configured by the RNC.

Optionally, step (i) in the foregoing third optional manner may specifically further include the following optional manner:

Third optional manner: The UE determines, according to the H-RNTI of the UE and the cycle length of the long DRX cycle, the radio frame on which long DRX on of the UE is in the long DRX cycle, by adopting the following formula:

$$(SFN\text{-}H\text{-}RNTI+65536) \bmod DRX\_Cycle\_Length < DRX\_On\_Length;$$

where SFN denotes a number of the radio frame on which long DRX on of the UE is in the long DRX cycle; H-RNTI is the H-RNTI of the UE, DRX_Cycle_Length is the cycle length of the long DRX cycle, DRX_On_Length is the long DRX on length, mod denotes modulo; and both the cycle length of the long DRX cycle and the long DRX on length take the length of one radio frame as a unit. Specifically, in the case of not making an integral number of radio frames, DRX_On_Length is rounded up to a nearest integer or can be denoted with a decimal fraction. For example, the DRX_On_Length is 6 radio subframes (one radio frame includes 5 radio subframes), so the DRX on length in the foregoing formula is 2 or 1.2. SFN denotes a number of the system frame, that is, the radio frame, and specifically the value range can be 0~4095.

For foregoing step (i), the foregoing third optional manner can be adopted. Correspondingly, step (ii) that the base station determines the radio subframe in the radio frame on which long DRX on of the UE is in the long DRX cycle may specifically also adopt the foregoing optional manner c, or may further include the following optional manner:

Optional manner d: The UE determines, according to the H-RNTI of the UE, the number of radio subframes included in the radio frame on which the long DRX on is in the long DRX cycle, the radio subframe in the radio frame on which long DRX on of the UE is in the long DRX cycle, by adopting the following formula:

$$(\text{Sub-frame-number}-\text{H-RNTI}+65536) \bmod (N*\text{Ceil}[\text{DRX\_On\_Length div } N])) < \text{DRX\_On\_Length};$$

where Sub-frame-number denotes a number of the radio subframe in the radio frame on which long DRX on of the UE is in the long DRX cycle, N denotes the number of radio subframes included in one radio frame; div denotes division, Ceil denotes rounding up to a nearest integer, H-RNTI is the H-RNTI of the UE; DRX_On_Length is the long DRX on length, and mod denotes modulo. For example, the DRX on length is 6 radio subframes, N denotes the number of radio subframes included in one radio frame, and its value is 5. It is assumed that the value of the H-RNTI is 0, and according to the foregoing formula, the UE can receive downlink data on radio subframes 0, 1, 2, and 3. Here, a numbers of the radio subframes are numbered from the first subframe of the radio frame on which long DRX on is. For example, it is obtained through calculation according to step 1 that the radio frames corresponding to long DRX_On are 5 and 6, so that the first radio subframe is the subframe corresponding to radio frame 5 and is numbered 0, and the following sequence numbers are 1, 2, 3, . . . , and 9 (9 corresponds to a number of the last subframe of the radio frame 6).

Step (ii) of determining the radio subframe in the radio frame on which long DRX on of the UE is in the long DRX cycle may further adopt the following manner e:

Optional manner e: It is determined that the radio subframe of the radio frame on which the user equipment receives data in the long discontinuous reception cycle, the specific implementation manner of which is:

(Sub_frame-H-RNTI+65536) mod 5<DRX_On_Length mod 5, where Sub_frame is 0, 1, 2, 3, 4, or (Sub_frame-H-RNTI+65536) mod 5<DRX_On_Length mod 5+1, where Sub_frame is 1, 2, 3, 4, 5 where Sub_frame is a number of a radio subframe in the radio frame, H-RNTI is the high speed downlink shared channel-radio network temporary identifier of the user equipment, and DRX_On_Length is the length of receiving data in the long discontinuous reception cycle, and is denoted by the number of radio subframes.

Alternatively, based on a predefined manner, the radio subframe of the radio frame on which data is received in the long discontinuous reception cycle is determined, for example:

First N subframes of one radio frame are used as the radio subframes of the radio frame on which data is received in the long discontinuous reception data, where N=DRX_On_Length mod 5. For example, a numbers of radio frames determined in step (i) are 5 and 6, and the received data length of data reception in the long discontinuous data reception is 12 ms, so that it can be determined that the user receives data in the first subframe of the radio frame No. 5 and the radio frame No. 6 in the discontinuous reception cycle.

That is, a numbers of radio frames on which the user can receive data in the discontinuous reception cycle determined according to the method in step (i) are 5 and 6, and a numbers of radio subframes determined according to step (i) are 1 and 2, so that it can be determined that the user receives data on subframes No. 1 and No. 2 corresponding to the radio frame No. 5 and the radio frame No. 6 in the discontinuous reception cycle.

It should be noted that, for the foregoing optional technical solutions, the technical solutions of the present invention are all described on the side of a UE. Specifically, the foregoing optional technical solutions are the same as the foregoing subsequent optional technical solutions in FIG. 1. The details can also be referred to the relevant technical solutions in the subsequent optional technical solutions in the foregoing embodiment shown in FIG. 1, which are no longer elaborated here.

The technical solutions in the foregoing embodiment are all technical solutions on the side of a UE. By adopting the foregoing technical solutions, when a shorter DRX-On length is set, the base station can accurately determine which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

Figure 3:
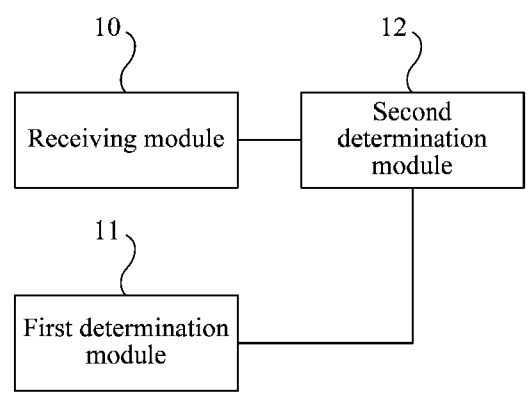
FIG. 3 is a schematic structural diagram of a base station according to an embodiment of the present invention.

FIG. 3 is a schematic structural diagram of a base station according to an embodiment of the present invention. As shown in FIG. 3, the base station in this embodiment may specifically include: a receiving module 10, a first determination module 11, and a second determination module 12.

The receiving module 10 is configured to receive a long DRX parameter sent by an RNC. The long DRX parameter includes at least two of a cycle length of the long DRX cycle, a long DRX on length, and a long DRX off length. The cycle length of the long DRX cycle equals the long DRX on length plus the long DRX off length. One of the three can be determined according to the rest two. At this time, the first preset duration corresponding to the first timer may be predefined by a UE, a base station, and the RNC. Alternatively, the first preset duration may be further predefined by the RNC. The long DRX parameter sent by the RNC to the base station received by the receiving module 10 carries the first preset duration. The first preset duration is an expiry time of the first timer and is used to control the UE to enter the long DRX cycle. The first determination module 11 is communicating with the receiving module 10. The first determination module 11 is configured to determine, when the UE enters the CELL-FACH state, and according to a first timer and a first preset duration corresponding to the first timer, that the UE enters the long DRX cycle. The second determination module 12 is connected to the receiving module 10 and the first determination module 11, respectively. The second determination module 12 is configured to determine, when the first determination module 11 determines that the UE enters the long DRX cycle, and according to the H-RNTI of the UE, and the cycle length of the long DRX cycle and the long DRX on length received by the receiving module 10 or determined by the receiving module 10 (when the DRX parameter received by the receiving module 10 only includes random two of the cycle length of the long DRX cycle, the long DRX on length and the long DRX off length, the rest one can be determined according to two), a radio subframe on which long DRX on of the UE is in the long DRX cycle.

In the base station in this embodiment, the mechanism of implementing radio data communications by adopting the foregoing modules is the same as the mechanism for implementing the foregoing relevant method embodiments. The details can also be referred to the records of the foregoing relevant method embodiments, which are no longer elaborated here.

In the base station in this embodiment, by adopting the foregoing modules, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Figure 4:
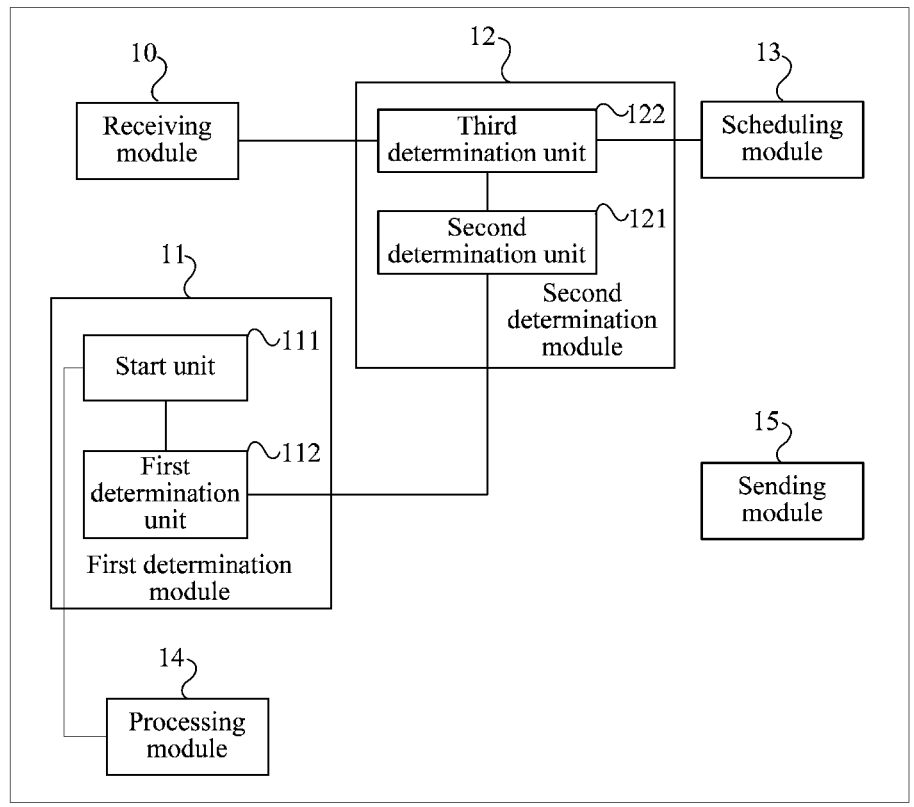
FIG. 4 is a schematic structural diagram of a base station according to another embodiment of the present invention.

FIG. 4 is a schematic structural diagram of a base station according to another embodiment of the present invention. As shown in FIG. 4, on the basis of the foregoing embodiment shown in FIG. 3, the base station in this embodiment may further include the following technical solution:

The base station in this embodiment may further include a scheduling module 13. The scheduling module 13 is connected to the second determination module 12. The scheduling module 13 is configured to schedule data of the UE on the radio subframe on which long DRX on is in the long DRX cycle determined by the second determination module 12.

The first determination module 11 may specifically include: a start unit 111 and a first determination unit 112. The start unit 111 is configured to start or restart a first timer when the UE enters the CELL-FACH state, and the base station allocates no common E-DCH resource to the UE and sends the H-RNTI of the UE on the HS-SCCH. Alternatively, the start unit 111 is configured to start or restart a first timer when the UE enters the CELL-FACH state, the base station allocates no common E-DCH resource to the UE, "DRX Interruption by HS-DSCH data" (that is, an indication of whether high speed downlink shared channel (High Speed Downlink Shared Channel, HS-DSCH) data can interrupt a DRX operation) is TRUE, and the base station sends the H-RNTI of the UE on the HS-SCCH. The first timer can expire when running till the first preset duration is up. The first preset duration may be predefined by the UE, the base station, and the RNC before communications. Alternatively, the first preset duration can be carried in the long DRX parameter by the RNC and informed to the base station and the UE. The first determination unit 112 is connected to the start unit 111. The first determination unit 112 is configured to, when the start unit 111 starts the first timer and the first timer runs till the first preset duration is up, and the first timer expires, determine that the UE enters the long DRX cycle. The "DRX Interruption by HS-DSCH data" is configurable, which may be set to TRUE or False. TRUE denotes that the HS-DSCH data can interrupt a DRX operation. That is, after the base station sends the H-RNTI of the UE on the HS-SCCH, the start unit 111 starts or restarts the first timer. When the value is false, it denotes that when the base station sends the H-RNTI of the UE on the HS-SCCH, the start unit 111 does not restart the first timer.

Optionally, in this embodiment, the start unit 111 is further configured to start a second timer before or while starting or restarting the first timer when the UE enters CELL-FACH state and has sent the H-RNTI of the UE on the HS-SCCH, and the base station allocates no common E-DCH resource to the UE. A second preset duration is set on the second timer. When the first timer and the second timer start at the same time, it is required that the second preset duration is shorter than the first preset duration. Alternatively, the start unit 111 is further configured to start or restart the second timer when the UE enters the CELL_FACH state, the base station allocates no common E-DCH resource to the UE, "DRX Interruption by HS-DSCH data" (that is, an indication of whether HS-DSCH data can interrupt a DRX operation is TRUE, and the base station sends the H-RNTI of the UE on the HS-SCCH. Alternatively, after releasing the common E-DCH resource of the UE, the base station starts or restarts the second timer. The first determination unit 112 is configured to, when the start unit 111 starts the second timer and the second timer runs till the second preset duration is up, and the second timer expires, determine that the UE enters the short DRX cycle. The difference between the long DRX cycle and the long DRX cycle is referred to the records of the embodiment shown in FIG. 1.

Optionally, the base station in this embodiment may further include a processing module 14. The processing module 14 is connected to the start unit 111, respectively. The processing module 14 is configured to, in a process that the first timer runs in the first preset duration after being started by the start unit 111, and when a common E-DCH is allocated to the UE, stop the first timer, and send data to the UE on the HS-DSCH continuously. Alternatively, the processing module 14 is further configured to, in a process that the second timer runs in the second preset duration after being started by the start unit 111, and when a common E-DCH is allocated to the UE, stop the second timer, and send data to the UE on the HS-DSCH continuously.

In one implementation scenario, optionally, the second determination module 12 in the base station in this embodiment is specifically configured to determine, when the UE enters the long DRX cycle, the radio subframe on which long DRX on of the UE is in the long DRX cycle according to the following formula:

$$(\text{Sub\_frame\_num-H-RNTI}+65536)\bmod \text{DRX\_Cycle\_Length} < \text{DRX\_On\_Length}$$

where Sub_frame_num denotes a number of a radio subframe on which long DRX on is in the long DRX cycle, H-RNTI is the H-RNTI of the UE, DRX_Cycle_Length is the cycle length of the long DRX cycle, DRX_On_Length is the long DRX on length; mod denotes modulo; and both the cycle length of the long DRX cycle and the long DRX on length take the length of one radio subframe as a unit. Specifically, both the cycle length of the long DRX cycle and the long DRX on length are denoted by the number of radio subframes. Optionally, the second determination module 12 in the base station in this embodiment may further determine a corresponding radio frame and radio subframes in the radio frame according to the obtained radio subframe on which the user equipment receives data in the long discontinuous reception cycle. For example, it may specifically be: radio frame=Sub_frame_num div M; and radio subframe in the radio frame=Sub_frame_num mod M, where M denotes the number of radio subframes included in one radio frame, div denotes division, and mod denotes modulo.

In one implementation scenario, the second determination module in the base station in this embodiment may be further configured to determine, when the user equipment enters the long discontinuous reception cycle, the radio frame and the radio subframe on which the user equipment receives data in the long discontinuous reception cycle according to the following formula:

$$(N*SFN+\text{Sub\_frame\_num}-\text{H-RNTI}+65536)\text{mod mod DRX\_Cycle\_Length}<\text{DRX\_On\_Length};$$

where N denotes the number of radio subframes included in one radio frame, SFN denotes a number of a system frame on which data is received in the long discontinuous reception cycle, and is denoted by the radio frame, Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

Alternatively, optionally, the second determination module 12 in this embodiment may specifically include: a second determination unit 121 and a third determination unit 122.

The second determination unit 121 is connected to the first determination module 11, for example, is connected to the first determination unit 112 in the first determination module 11. The second determination unit 121 is configured to determine, when the UE enters the long DRX cycle, the start subframe of the radio subframe on which long DRX on of the UE is in the long DRX cycle according to the following formula:

$$\text{start-Sub\_frame\_num}=\text{H-RNTI mod DRX\_Cycle\_Length}+n*\text{DRX\_Cycle\_Length};$$

where n is 0 or a positive integer, start-Sub_frame_num denotes a number of a start radio subframe of a radio subframe on which long DRX on is in the long DRX cycle; start-Sub_frame_num is not greater than a maximum subframe number (4096*5−1); and mod denotes modulo. Optionally, the second determination module 12 in the base station in this embodiment may further determine a corresponding radio frame and radio subframes in the radio frame according to the obtained radio subframe on which the user equipment receives data in the long discontinuous reception cycle. For example, it may specifically be: radio frame=Sub_frame_num div M; and radio subframe in the radio frame=Sub_frame_num mod M, where M denotes the number of radio subframes included in one radio frame, div denotes division, and mod denotes modulo.

The third determination unit 122 is connected to the receiving module 10 and the second determination unit 121, respectively. The third determination unit 122 is configured to determine, according to the start subframe of the radio subframe on which long DRX on of the UE is in the long DRX cycle determined by the second determination unit 121 and the long DRX on length received by the receiving module 10 or determined by the receiving module 10 (for example, when the DRX parameter received by the receiving module 10 includes the cycle length of the long DRX cycle and the long DRX off length, the long DRX on length can be determined according to the two), a radio subframe on which long DRX on of the UE is in the long DRX cycle; where both the cycle length of the long DRX cycle and the long DRX on length take the length of one radio subframe as a unit. Specifically, both the cycle length of the long DRX cycle and the long DRX on length are denoted by the number of radio subframes. At this time, the corresponding scheduling module 13 is connected to the third determination unit 122. The scheduling module 13 is configured to schedule data of the UE on the radio subframe on which long DRX on is in the long DRX cycle determined by the third determination unit 122.

In one implementation scenario, the second determination module in this embodiment is specifically configured to determine the radio frame and a start subframe of the subframe on which the user equipment receives data in the long discontinuous reception cycle according to the following formula:

$$\text{SFN}*M+\text{start-Sub\_frame\_num}=\text{H-RNTI mod DRX\_Cycle\_Length}+n*\text{DRX\_Cycle\_Length};$$

where M denotes the number of radio subframes included in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo.

The base station determines, according to the radio frame and the start subframe of the radio subframe on which the user equipment receives data in the long discontinuous reception cycle and a length of receiving data in the long discontinuous reception cycle, the radio frame and the radio subframe on which the user equipment receives data in the long discontinuous reception cycle. The cycle length of the long discontinuous reception cycle and the length of receiving data in the long discontinuous reception cycle are denoted by the number of the radio subframes. Alternatively, optionally, the second determination unit 121 in the second determination module 12 in the base station in this embodiment is configured to determine, when the UE enters the long DRX cycle, and according to the H-RNTI of the UE and the cycle length of the long DRX cycle, the radio frame on which long DRX on of the UE is in the long DRX cycle. The cycle length of the long DRX cycle takes the length of one radio frame as a unit. Specifically, the cycle length of the long DRX cycle is denoted by the number of radio frames. The third determination unit 122 is configured to determine the radio subframe in the radio frame on which long DRX on of the UE is in the long DRX cycle.

Further, optionally, the second determination unit 121 in the foregoing technical solution is specifically configured to determine, according to the H-RNTI of the UE and the cycle length of the long DRX cycle, the radio frame on which long DRX on of the UE is in the long DRX cycle, by adopting the following formula:

(SFN-H-RNTI+65536)mod DRX_Cycle_Length<1;

where SFN denotes the radio frame on which long DRX on of the UE is in the long DRX cycle, H-RNTI is the H-RNTI of the UE, DRX_Cycle_Length is the cycle length of the long DRX cycle, and mod denotes modulo; where the cycle length of the long DRX cycle takes the length of one radio frame as a unit. Specifically, the cycle length of the long DRX cycle is denoted by the number of radio frames.

Alternatively, the second determination unit 121 specifically configured to according to the H-RNTI of the UE and the cycle length of the long DRX cycle, by adopting the following formula determine The radio frame on which long DRX on of the UE is in the long DRX cycle:

SFN=H-RNTI mod DRX_Cycle_Length+ n*DRX_Cycle_Length;

where SFN denotes the radio frame on which long DRX on of the UE is in the long DRX cycle, n is 0 or a positive integer; H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is denoted by the number of radio frames.

Optionally, correspondingly, the third determination unit 122 is specifically configured to determine, according to the H-RNTI of the UE, the number of radio subframes included in the radio frame on which the long DRX on is in the long DRX cycle, and the cycle length of the long DRX cycle, the radio subframe in the radio frame on which long DRX on of the UE is in the long DRX cycle, by adopting the following formula:

Sub-frame-number=floor(H-RNTI div DRX_Cycle_Length)mod N where Sub-frame-number denotes a radio subframe number, floor denotes rounding down to the nearest integer; N denotes the number of radio subframes included in one radio frame; div denotes division, H-RNTI is the H-RNTI of the UE, DRX_Cycle_Length is the cycle length of the long DRX cycle; and mod denotes modulo.

Alternatively, optionally, the corresponding third determination unit 122 is specifically configured to determine, according to the H-RNTI of the UE and the number of radio subframes included in the radio frame on which the long DRX on is in the long DRX cycle, the radio subframe in the radio frame on which long DRX on of the UE is in the long DRX cycle, by adopting the following formula:

Sub-frame-number=H-RNTI mod N;

where Sub-frame-number denotes a number of the radio subframe in the radio frame on which long DRX on of the UE is in the long DRX cycle, N denotes the number of radio subframes included in one radio frame; div denotes division, H-RNTI is the H-RNTI of the UE, DRX_Cycle_Length is the cycle length of the long DRX cycle; and mod denotes modulo.

Alternatively, optionally, the third determination unit determines the radio subframe in the radio frame on which the user equipment receives data in the long discontinuous reception cycle, which specifically includes:

(Sub_frame-H-RNTI+65536) mod 5<DRX_On_Length mod 5, where subframe number Sub_frame the value range of is an integer from 0 to 4, or (Sub_frame-H-RNTI+65536) mod 5<DRX_On_Length mod 5+1, where the value range of the subframe number Sub_frame is an integer from 1 to 5;

where Sub_frame is a number of a radio subframe in the radio frame, H-RNTI is the high speed downlink shared channel-radio network temporary identifier of the user equipment, DRX_On_Length is the length of receiving data in the long discontinuous reception cycle, and is denoted by the number of radio subframes.

Alternatively, the third determination unit determines the radio subframe in the radio frame on which the user equipment receives data in the long discontinuous reception cycle, which specifically includes:

using first N subframes of one radio frame as the radio subframes of the radio frame on which data is received in the long discontinuous reception cycle, where N=DRX_On_Length mod 5.

Alternatively, optionally, the second determination unit 121 in this embodiment is further specifically configured to determine, according to the H-RNTI of the UE and the cycle length of the long DRX cycle, the radio frame on which long DRX on of the UE is in the long DRX cycle, by adopting the following formula:

(SFN-H-RNTI+65536)mod DRX_Cycle_Length<DRX_On_Length;

where SFN denotes the radio frame on which long DRX on of the UE is in the long DRX cycle number; H-RNTI is the H-RNTI of the UE, DRX_Cycle_Length is the cycle length of the long DRX cycle, DRX_On_Length is the long DRX on length, mod denotes modulo; both the cycle length of the long DRX cycle and the long DRX on length take the length of one radio frame as a unit; and specifically, both the cycle length of the long DRX cycle and the long DRX on length are denoted by the number of radio frames.

Correspondingly, the third determination unit 122 is specifically configured to determine, according to the H-RNTI of the UE, the number of radio subframes included in the radio frame on which the long DRX on is in the long DRX cycle, and the cycle length of the long DRX cycle, the radio subframe in the radio frame on which long DRX on of the UE is in the long DRX cycle, by adopting the following formula:

(Sub-frame-number-H-RNTI+65536)mod(N*Ceil [DRX_On_Length div N])<DRX_On_Length;

where Sub-frame-number denotes a number of the radio subframe in the radio frame on which long DRX on of the UE is in the long DRX cycle, N denotes the number of radio subframes included in one radio frame; div denotes division, Ceil denotes rounding up to a nearest integer, H-RNTI is the H-RNTI of the UE, DRX_On_Length is the long DRX on length; and mod denotes modulo.

Further, optionally, the third determination unit 122 is specifically configured to receive the identifier corresponding to the radio subframe in the radio frame on which long DRX on of the UE is in the long DRX cycle sent by the RNC, and the radio subframe is configured by the RNC.

Optionally, on the basis of all the foregoing optional technical solutions, the base station in this embodiment may further include a sending module 15. The sending module 15 is configured to send, when the UE enters the long DRX cycle, a flow control frame to the RNC. The flow control frame carries a UE identifier list, a time period and the maximum amount of data sent within the time period, so that the RNC controls, according to the time period and the maximum amount of data sent within the time period in the flow control frame, the amount of data sent to a UE corresponding to the UE identifier list.

Alternatively, the sending module 15 is configured to send a flow control frame to the RNC. The flow control frame carries a UE identifier list and an indication that a UE in the UE identifier list enters or exits a long DRX cycle, so that the RNC controls, according to the indication that a UE in the UE identifier list enters or exits a long DRX cycle, the amount of data sent to a UE corresponding to the UE identifier list.

Alternatively, the sending module 15 is configured to send a flow control frame to the RNC periodically. The flow control frame carries a UE identifier list of entering the long DRX cycle in the current cycle, a time period and the maximum amount of data sent within the time period, so that the RNC controls, according to the time period and the maximum amount of data sent within the time period, the amount of data sent to a UE corresponding to the UE identifier list.

For the base station in this embodiment, all the foregoing optional technical solutions are introduced as examples to introduce the technical solutions of the present invention. In practical applications, all the foregoing optional technical solutions can form an optional embodiment of the present invention by adopting a random combination, which is no longer elaborated here. In FIG. 4, an example in which the first determination module 11 includes the start unit 111 and the first determination unit 112 and the second determination module 12 includes the second determination unit 121 and the third determination unit 122 is taken to introduce the technical solutions of the present invention.

For the base station in this embodiment, the mechanism for implementing radio data communications by adopting the foregoing modules is the same as the mechanism for implementing the foregoing relevant method embodiment. The details can also be referred to the records of the foregoing relevant method embodiments, which are no longer elaborated here.

For the base station in this embodiment, by adopting the foregoing modules, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Figure 5:
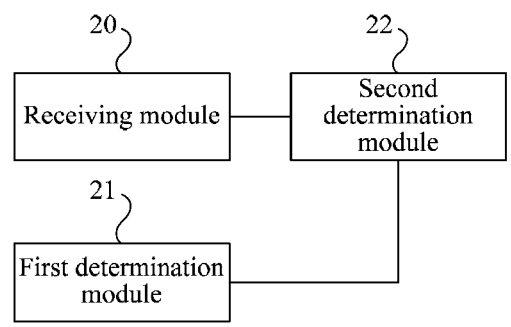
FIG. 5 is a schematic structural diagram of a UE according to an embodiment of the present invention.

FIG. 5 is a schematic structural diagram of a UE according to an embodiment of the present invention. As shown in FIG. 5, a UE in this embodiment may specifically include: a receiving module 20, a first determination module 21, and a second determination module 22.

The receiving module 20 is configured to receive a long DRX parameter sent by an RNC. The long DRX parameter includes at least two of a cycle length of the long DRX cycle, a long DRX on length, and a long DRX off length. The cycle length of the long DRX cycle equals the long DRX on length plus the long DRX off length. The first determination module 21 is communicating with the receiving module 20.

The first determination module 21 is configured to determine, when the UE enters the CELL-FACH state, and according to a third timer and a third preset duration corresponding to the third timer, that the UE enters the long DRX cycle. At this time, the third preset duration corresponding to the third timer may be predefined by a UE, a base station, and the RNC. Alternatively, the third preset duration may be further predefined by the RNC. The long DRX parameter received by the receiving module 20 and sent to UE by the RNC carries the third preset duration. The third preset duration is an expiry time of the third timer and is used to control the UE to enter the long DRX cycle. The third timer corresponds to, and may be identical to, the first timer in the base station. The third preset duration is the same as the first preset duration. The second determination module 22 is connected to the receiving module 20 and the first determination module 21, respectively. The second determination module 22 is configured to determine, when the first determination module 21 determines that the UE enters the long DRX cycle, and according to the H-RNTI of the UE, and the cycle length of the long DRX cycle and the long DRX on length received by the receiving module 20 or determined by the receiving module 20 (when the DRX parameter received by the receiving module 20 only includes random two of the cycle length of the long DRX cycle, the long DRX on length, and the long DRX off length, the rest one can be determined according to the two), the radio subframe on which long DRX on is in the long DRX cycle.

For the UE in this embodiment, the mechanism for implementing radio data communications by adopting the foregoing modules is the same as the mechanism for implementing the foregoing relevant method embodiment. The details can also be referred to the records of the foregoing relevant method embodiments, which are no longer elaborated here.

For the UE in this embodiment, by adopting the foregoing modules, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Figure 6:
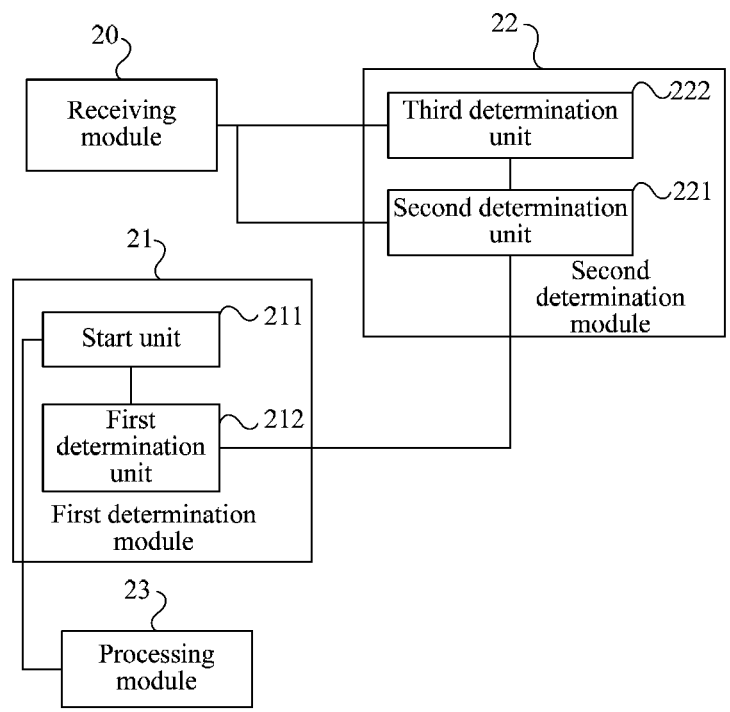
FIG. 6 is a schematic structural diagram of a UE according to another embodiment of the present invention.

FIG. 6 is a schematic structural diagram of a UE according to another embodiment of the present invention. As shown in FIG. 6, on the basis of the foregoing embodiment shown in FIG. 5, the base station in this embodiment may further include the following technical solution:

The receiving module 20 in the UE in this embodiment is further configured to receive data sent by the base station on the radio subframe on which long DRX on is in the long DRX cycle determined by the second determination module 22.

The first determination module 21 in the UE in this embodiment includes a start unit 211 and a first determination unit 212. The start unit 211 is configured to start or restart a third timer when the UE enters the CELL-FACH state and the UE does not occupy a common E-DCH resource and monitors its own H-RNTI on the HS-SCCH; and the third timer can expire when running till the third preset duration is up. Alternatively, the start unit 211 is configured to start or restart the third timer when the UE does not occupy a common E-DCH resource, "DRX Interruption by HS-DSCH data" (that is, an indication of whether high speed downlink shared channel (High Speed Downlink Shared Channel, HS-DSCH) data can interrupt a DRX operation) is TRUE, and the UE monitors its own H-RNTI on the HS-SCCH. The "DRX Interruption by HS-DSCH data" is configurable, which may be set to TRUE or False. TRUE denotes that the HS-DSCH data can interrupt a DRX operation. That is, when the UE monitors its own H-RNTI on the HS-SCCH, the start unit 211 starts or restarts the third timer. When the value is false, it denotes that when the UE sends the H-RNTI of the UE on the HS-SCCH, the start unit 211 does not restart the third timer. The first determination unit 212 is connected to the start unit 211. The first determination unit 212 is configured to, when the start unit 211 starts the third timer and the third timer runs till the third preset duration is up, and the third timer expires, determine that the UE enters the long DRX cycle.

Optionally, in this embodiment, the start unit 211 is further configured to start or restart a fourth timer before or while starting or restarting the third timer when the UE enters the CELL-FACH state and monitors its own H-RNTI on the HS-SCCH. A fourth preset duration is set on the fourth timer. For example, the fourth timer can be a T321 timer in the prior art. Alternatively, the start unit 211 is further configured to start or restart the fourth timer, for example, a T321 timer, when the UE enters the CELL-FACH state, the UE does not occupy a common E-DCH resource, "DRX Interruption by HS-DSCH data" (that is, an indication of whether HS-DSCH data can interrupt a DRX operation) is TRUE, and the UE sends the H-RNTI of the UE on the HS-SCCH. Alternatively, after the UE releases the common E-DCH resource, the start unit 211 starts or restarts the fourth timer, for example, a T321 timer. Optionally, when the third timer and the fourth timer start at the same time, it is required that the fourth preset duration is shorter than the third preset duration. The fourth timer is identical to the second timer in the base station. The fourth preset duration is also identical to the second preset duration. Here, like the third preset duration, the fourth preset duration may be predefined by the UE, base station and RNC. Alternatively, the third preset duration can be further predefined by the RNC, and the RNC sends the third preset duration to the UE. The first determination unit 212 is further configured to, when the start unit 211 starts the fourth timer and the fourth timer runs till the fourth preset duration is up, and the fourth timer expires, determine that the UE enters a short DRX cycle. The difference between the long DRX cycle and the long DRX cycle is referred to the records of the embodiment shown in FIG. 1.

Optionally, the UE in this embodiment may further include a processing module 23. The processing module 23 is connected to the start unit 211. The processing module 23 is configured to, in a process that the start unit 211 starts the third timer and the third timer runs in the third preset duration, and when the UE wins a common E-DCH allocated by the base station, stop the third timer, and receive the data sent by the base station on the HS-DSCH continuously. Alternatively, the processing module 23 is further configured to, in a process that the fourth timer starts and runs in the fourth preset duration, and when the UE wins the common E-DCH allocated by the base station, stop the fourth timer, and receive the sent by the data base station on the HS-DSCH continuously.

In one implementation scenario, optionally, the second determination module 22 in the UE in this embodiment is specifically configured to determine, when the UE enters the long DRX cycle, a radio subframe on which long DRX on of the UE is in the long DRX cycle according to the following formula:

$$(\text{Sub\_frame\_num} - \text{H-RNTI} + 65536) \bmod \text{DRX\_Cycle\_Length} < \text{DRX\_On\_Length}$$

where Sub_frame_num denotes a number of a radio subframe on which long DRX on is in the long DRX cycle, H-RNTI is the H-RNTI of the UE, DRX_Cycle_Length is the cycle length of the long DRX cycle, DRX_On_Length is the long DRX on length; mod denotes modulo; both the cycle length of the long DRX cycle and the long DRX on length take the length of one radio subframe as a unit. Optionally, the second determination module 22 in the UE in this embodiment may further determine a corresponding radio frame and radio subframes in the radio frame according to the obtained radio subframe on which the user equipment receives data in the long discontinuous reception cycle. For example, it may specifically be: radio frame=Sub_frame_num div M; and radio subframe in the radio frame=Sub_frame_num mod M, where M denotes the number of radio subframes included in one radio frame, div denotes division, and mod denotes modulo.

In one implementation scenario, optionally, the second determination module 22 in the UE in this embodiment may be further configured to determine, when the user equipment enters the long discontinuous reception cycle, the radio subframe and the radio frame on which the user equipment receives data in the long discontinuous reception cycle:

$$(N*\text{SFN} + \text{Sub\_frame\_num} - \text{H-RNTI} + 65536) \bmod \text{DRX\_Cycle\_Length} < \text{DRX\_On\_Length};$$

where N denotes the number of radio subframes included in one radio frame, SFN denotes a number of a system frame on which data is received in the long discontinuous reception cycle, and is denoted by the radio frame, Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

In one implementation scenario, optionally, the second determination module 22 in the UE in this embodiment may be further configured to determine, when the user equipment enters the long discontinuous reception cycle, the radio frame and a start frame number of the radio subframe on which the user equipment receives data in the long discontinuous reception cycle according to the following formula:

$$\text{SFN}*M + \text{start-Sub\_frame\_num} = \text{H-RNTI} \bmod \text{DRX\_Cycle\_Length} + n*\text{DRX\_Cycle\_Length};$$

where M denotes the number of radio subframes included in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo.

The user equipment determines, according to the radio frame and the start subframe of the radio subframe on which data is received in the long discontinuous reception cycle and a length of receiving data in the long discontinuous reception cycle, the radio frame and the radio subframe on which the user equipment receives data in the long discontinuous reception cycle. The cycle length of the long discontinuous reception cycle and the length of receiving data in the long discontinuous reception cycle are denoted by the number of the radio subframes.

Alternatively, optionally, the second determination module 22 in this embodiment is specifically configured to determine, when the UE enters the long DRX cycle, the start subframe of the radio subframe on which long DRX on of the UE is in the long DRX cycle according to the following formula:

start-Sub_frame_num=H-RNTI mod DRX_Cycle_Length+n*DRX_Cycle_Length;

where n is 0 or a positive integer, start-Sub_frame_num denotes a number of a start radio subframe of a radio subframe on which long DRX on is in the long DRX cycle; start-Sub_frame_num is not greater than a maximum subframe number (4096*5−1); mod denotes modulo; and determine, according to the start subframe of the radio subframe on which long DRX on of the UE is in the long DRX cycle and the long DRX on length, a radio subframe on which long DRX on of the UE is in the long DRX cycle. Both the cycle length of the long DRX cycle and the long DRX on length take the length of one radio subframe as a unit. Specifically, both the cycle length of the long DRX cycle and the long DRX on length are denoted by the number of radio subframes. Optionally, the second determination module 22 in the UE in this embodiment may further determine a corresponding radio frame and radio subframes in the radio frame according to the obtained radio subframe on which the user equipment receives data in the long discontinuous reception cycle. For example, it may specifically be: radio frame=Sub_frame_num div M; and radio subframe in the radio frame=Sub_frame_num mod M, where M denotes the number of radio subframes included in one radio frame, div denotes division, and mod denotes modulo.

Alternatively, optionally, the second determination module 22 in this embodiment may specifically include: a second determination unit 221 and a third determination unit 222.

The second determination unit 221 is connected to the receiving module 20 and the first determination module 21, respectively, for example, is connected to the first determination unit 212. The second determination unit 221 is configured to determine, when the first determination unit 212 determines that the UE enters the long DRX cycle, and according to the H-RNTI of the UE and the cycle length of the long DRX cycle received by the receiving module 20 or determined by the receiving module 20, a radio frame on which long DRX on is in the long DRX cycle. The cycle length of the long discontinuous reception cycle of the UE and the long DRX data take the length of one radio frame as a unit.

The third determination unit 222 is connected to the receiving module 20 and the second determination unit 221, respectively. The third determination unit 222 is configured to determine, according to the radio frame on which long DRX on is in the long DRX cycle determined by the second determination unit 121, and at least two of the cycle length of the long DRX cycle, long DRX on length, and long DRX off length received by the receiving module 20, the radio subframe in the radio frame on which long DRX on of the UE is in the long DRX cycle. Correspondingly, the receiving module 20 is further connected to the third determination unit 222. The receiving module 20 is further configured to receive the data sent by the base station on the radio subframe on which long DRX on is in the long DRX cycle determined by the third determination unit 222.

Alternatively, optionally, the second determination unit 221 in the second determination module 22 in the base station in this embodiment is specifically configured to determine, according to the H-RNTI of the UE and the cycle length of the long DRX cycle received by the receiving module 20 or determined by the receiving module 20, the radio frame on which long DRX on of the UE is in the long DRX cycle, by adopting the following formula:

(SFN-H-RNTI+65536)mod DRX_Cycle_Length<1;

where SFN denotes the radio frame on which long DRX on of the UE is in the long DRX cycle, H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is denoted by the number of radio frames.

Alternatively, the second determination unit 221 is specifically configured to determine, according to the H-RNTI of the UE and the cycle length of the long DRX cycle received by the receiving module 20 or determined by the receiving module 20, the radio frame on which long DRX on of the UE is in the long DRX cycle, by adopting the following formula:

SFN=H-RNTI mod DRX_Cycle_Length+n*DRX_Cycle_Length;

where SFN denotes the radio frame on which long DRX on of the UE is in the long DRX cycle, n is 0 or a positive integer; H-RNTI is the H-RNTI of the UE, DRX_Cycle_Length is the cycle length of the long DRX cycle, mod denotes modulo; the cycle length of the long DRX cycle takes the length of one radio frame as a unit; and specifically, the cycle length of the long DRX cycle is denoted by the number of radio frames.

Alternatively, optionally, the corresponding third determination unit 222 is specifically configured to determine, according to the H-RNTI of the UE, the number of radio subframes included in the radio frame on which the long DRX on is in the long DRX cycle, and the cycle length of the long DRX cycle received by the receiving module 20 or determined by the receiving module 20, the radio subframe in the radio frame on which long DRX on of the UE is in the long DRX cycle, by adopting the following formula:

Sub-frame-number=floor(H-RNTI div DRX_Cycle_Length)mod N where Sub-frame-number denotes a radio subframe number, floor denotes rounding down to the nearest integer; N denotes the number of radio subframes included in one radio frame; div denotes division, H-RNTI is the H-RNTI of the UE, DRX_Cycle_Length is the cycle length of the long DRX cycle; and mod denotes modulo.

Alternatively, the third determination unit 222 is specifically configured to determine, according to the H-RNTI of the UE and the number of radio subframes included in the radio frame on which the long DRX on is in the long DRX cycle received by the receiving module 20 or determined by the receiving module 20, the radio subframe in the radio frame on which long DRX on of the UE is in the long DRX cycle, by adopting the following formula:

Sub-frame-number=H-RNTI mod N;

where Sub-frame-number denotes a number of the radio subframe in the radio frame on which long DRX on of the UE is in the long DRX cycle, N denotes the number of radio subframes included in one radio frame; div denotes division, H-RNTI is the H-RNTI of the UE, DRX_Cycle_Length is the cycle length of the long DRX cycle; and mod denotes modulo.

Alternatively, the third determination unit 222 may be further specifically configured to determine radio subframes in the radio frame on which the user equipment receives data in the long discontinuous reception cycle, which specifically includes:

(Sub_frame-H-RNTI+65536) mod 5<DRX_On_Length mod 5, where the value range of Sub-frame is an integer from 0 to 4, or (Sub_frame-H-RNTI+65536) mod 5<DRX_On_Length mod 5+1, where the value range of the subframe number is an integer from 1 to 5;

where Sub_frame is a number of a radio subframe in the radio frame, H-RNTI is the high speed downlink shared channel-radio network temporary identifier of the user equipment, DRX_On_Length is the length of receiving data in the long discontinuous reception cycle, and is denoted by the number of radio subframes.

Alternatively, the third determination unit 222 may be further specifically configured to determine radio subframes in the radio frame on which the user equipment receives data in the long discontinuous reception cycle, which specifically includes:

using first N subframes of one radio frame as the radio subframes of the radio frame on which data is received in the long discontinuous reception cycle, where N=DRX_On_Length mod 5.

Optionally, the second determination unit 221 is specifically configured to determine, according to the H-RNTI of the UE and the cycle length of the long DRX cycle received by the receiving module 20 or determined by the receiving module 20, the radio frame on which long DRX on of the UE is in the long DRX cycle, by adopting the following formula:

(SFN-H-RNTI+65536)mod
 DRX_Cycle_Length<DRX_On_Length;

where SFN denotes the radio frame on which long DRX on of the UE is in the long DRX cycle number; H-RNTI is the H-RNTI of the UE, DRX_Cycle_Length is the cycle length of the long DRX cycle, DRX_On_Length is the long DRX on length, mod denotes modulo; both the cycle length of the long DRX cycle and the long DRX on length take the length of one radio frame as a unit; and specifically, both the cycle length of the long DRX cycle and the long DRX on length are denoted by the number of radio frames.

Correspondingly, the third determination unit 222 is specifically configured to determine, according to the H-RNTI of the UE, the number of radio subframes included in the radio frame on which the long DRX on is in the long DRX cycle, and the cycle length of the long DRX cycle received by the receiving module 20 or determined by the receiving module 20, the radio subframe in the radio frame on which long DRX on of the UE is in the long DRX cycle, by adopting the following formula:

(Sub-frame-number-H-RNTI+65536)mod($N$*Ceil
 [DRX_On_Length div $N$])<DRX_On_Length;

where Sub-frame-number denotes a number of the radio subframe in the radio frame on which long DRX on of the UE is in the long DRX cycle, N denotes the number of radio subframes included in one radio frame; div denotes division, Ceil denotes rounding up to a nearest integer, H-RNTI is the H-RNTI of the UE, DRX_On_Length is the long DRX on length; and mod denotes modulo.

Optionally, the third determination unit 222 in this embodiment is specifically configured to receive identifier corresponding to the radio subframe in the radio frame on which long DRX on of the UE is in the long DRX cycle sent by the RNC, and the radio subframe is configured by the RNC.

For the base station in this embodiment, all the foregoing optional technical solutions are introduced as examples to introduce the technical solutions of the present invention. In practical applications, all the foregoing optional technical solutions can form an optional embodiment of the present invention by adopting a random combination, which is no longer elaborated here. In FIG. 5, an example in which the first determination module 21 includes the start unit 211 and the first determination unit 212, the second determination module 22 includes the second determination unit 221 and the third determination unit 222, and both the second determination unit 221 and the third determination unit 222 included in the second determination module 22 are connected to the receiving module 20 is taken to introduce the technical solutions of the present invention.

For the base station in this embodiment, the mechanism for implementing radio data communications by adopting the foregoing modules is the same as the mechanism for implementing the foregoing relevant method embodiment. The details can also be referred to the records of the foregoing relevant method embodiments, which are no longer elaborated here.

For the UE in this embodiment, by adopting the foregoing modules, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

Figure 7:
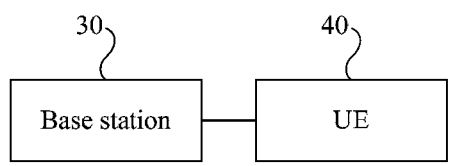
FIG. 7 is a schematic structural diagram of a radio data communications system according to an embodiment of the present invention.

FIG. 7 is a schematic structural diagram of a radio data communications system according to an embodiment of the present invention. As shown in FIG. 7, the radio data communications system in this embodiment may specifically include a base station 30 and a UE 40. The base station 30 communicates with the UE 40.

The base station 30 in this embodiment may specifically adopt the base station in the foregoing embodiment shown in FIG. 3 or FIG. 4. The UE 40 may specifically adopt the UE in the foregoing embodiment shown in FIG. 5 or FIG. 6. Specifically, the records of the embodiment shown in FIG. 1, the embodiment shown in FIG. 2, and the extension embodiments of the embodiments shown in FIG. 1 and FIG. 2 can be adopted. The details can be referred to the records of the foregoing relevant embodiments, which are no longer elaborated here.

For the radio data communications system in this embodiment, by adopting the foregoing base station and UE, when a shorter DRX-On length is set, it can be accurately determined which radio subframe DRX-on specifically is on. Compared with the prior art in which it can only be determined which radio frame the DRX-on is on, when a shorter DRX-On length is set, one radio frame may include a plurality of radio subframes, and a radio subframe cannot be accurately determined by adopting the prior art. Therefore, by adopting the technical solution in this embodiment, a radio subframe on which the DRX-On is can be accurately determined, so as to effectively enhance data processing efficiency.

The base station in the embodiments of present invention can be specifically an entity having the function of a base station such as a NodeB, an eNodeB or a radio access point (Access Point, AP).

The device embodiments are merely exemplary. Units described as separate components may be or may not be physically separated. Components shown as units may be or may not be physical units, that is, may be integrated or distributed to at least two network units. Some or all of the modules may be selected to achieve the objective of the solution of the embodiment according to actual demands. Persons of ordinary skill in the art can understand and implement the present invention without making creative efforts.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to a part or all of the technical features; and such modifications or replacements do not cause the essence of corresponding technical solutions to depart from the scope of the technical solutions of the embodiments of the present invention.

What is claimed is:

1. A radio data communication method, comprising:
receiving, by a user equipment, a long discontinuous reception parameter sent by a radio network controller, wherein the long discontinuous reception parameter comprises at least two of a cycle length of a long discontinuous reception cycle, a length of receiving data in the long discontinuous reception cycle, and a length of not receiving data in the long discontinuous reception cycle, wherein the cycle length of the long discontinuous reception cycle is denoted by a number of radio frames comprising the long discontinuous reception cycle;
determining, when the user equipment enters a cell-forward access channel state, and according to a third timer and a third preset duration corresponding to the third timer, that the user equipment enters the long discontinuous reception cycle; and
determining, when the user equipment enters the long discontinuous reception cycle, by the user equipment, and according to a high speed downlink shared channel-radio network temporary identifier of the user equipment, the cycle length of the long discontinuous reception cycle, and the length of the receiving data in the long discontinuous reception cycle, the radio frames on which data is received in the long discontinuous reception cycle.

2. The method according to claim 1, further comprising:
receiving, by the user equipment, on the radio frames on which data is received in the long discontinuous reception cycle, data sent by the base station.

3. The method according to claim 1, wherein the determining, when the user equipment enters the cell-forward access channel state, and according to the third timer and the third preset duration, that the user equipment enters the long discontinuous reception cycle, comprises:

starting or restarting the third timer when the user equipment enters the cell-forward access channel state, the user equipment does not occupy a common enhanced-dedicated channel resource, and the user equipment monitors its own high speed downlink shared channel-radio network temporary identifier on a high speed-shared control channel; and when the third timer starts and runs till the third preset duration is up, and the third timer expires, entering, by the user equipment, the long discontinuous reception cycle.

4. The method according to claim 3, wherein before or while the starting or restarting the third timer when the user equipment enters the cell-forward access channel state, the user equipment does not occupy the common enhanced-dedicated channel resource, and the user equipment monitors its own high speed downlink shared channel-radio network temporary identifier on the high speed-shared control channel, the method further comprises:
starting or restarting, by the user equipment, a fourth timer, wherein a fourth preset duration is set on the fourth timer; and
when the fourth timer starts and runs till the fourth preset duration is up, and the fourth timer expires, entering, by the user equipment, a short discontinuous reception cycle.

5. The method according to claim 4, further comprising:
in a process that the third timer starts and runs in the third preset duration, and when the user equipment wins the common enhanced-dedicated channel resource allocated by the base station, stopping the third timer, and receiving the data sent by the base station continuously on a high speed downlink shared channel; and
in a process that the fourth timer starts and runs in the fourth preset duration, and when the user equipment wins the common enhanced-dedicated channel resource allocated by the base station, stopping the fourth timer, and receiving the data sent by the base station entered on the high speed downlink shared channel continuously.

6. The method according to claim 1, wherein the determining, when the user equipment enters the long discontinuous reception cycle, and according to the high speed downlink shared channel-radio network temporary identifier of the user equipment, the cycle length of the long discontinuous reception cycle, and the length of receiving data in the long discontinuous reception cycle, the radio subframe on which data is received in the long discontinuous reception cycle comprises:
when the user equipment enters the long discontinuous reception cycle, determining the radio subframe on which the user equipment receives data in the long discontinuous reception cycle according to the following formula:

$$(\text{Sub\_frame\_num-H-RNTI}+65536) \bmod \text{DRX\_Cycle\_Length} < \text{DRX\_On\_Length}$$

wherein Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of the receiving data in the long discontinuous reception cycle are denoted by the number of the radio subframes.

7. The method according to claim 6, further comprising: determining a corresponding radio frame and radio subframes in the radio frame according to the obtained radio subframe on which the user equipment receives the data in the long discontinuous reception cycle.

8. The method according to claim 7, wherein the determining the corresponding radio frame and the radio subframes in the radio frame according to the obtained radio subframe on which the user equipment receives the data in the long discontinuous reception cycle further comprises:
radio frame=Sub_frame_num div M; and radio subframe in the radio frame=Sub_frame_num mod M, wherein M denotes the number of radio subframes comprised in one radio frame, div denotes division, and mod denotes modulo.

9. The method according to claim 1, wherein the determining the radio frames on which data is received in the long discontinuous reception cycle further comprises:
determining the radio frame and the radio subframe on which the user equipment receives data in the long discontinuous reception cycle according to the following formula:

$$(N*\text{SFN}+\text{Sub\_frame\_num}-\text{H-RNTI}+65536) \bmod \text{DRX\_Cycle\_Length} < \text{DRX\_On\_Length};$$

wherein N denotes the number of radio subframes comprised in one radio frame, SFN denotes a number of a system frame on which data is received in the long discontinuous reception cycle, and is denoted by the radio frame, Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

10. The method according to claim 1, wherein the determining, when the user equipment enters the long discontinuous reception cycle, and according to the high speed downlink shared channel-radio network temporary identifier of the user equipment, the cycle length of the long discontinuous reception cycle, and the length of receiving data in the long discontinuous reception cycle, the radio subframe on which data is received in the long discontinuous reception cycle comprises:
when the user equipment enters the long discontinuous reception cycle, determining a start subframe of the radio subframe on which the user equipment receives data in the long discontinuous reception cycle according to the following formula:

$$\text{start-Sub\_frame\_num}=\text{H-RNTI} \bmod \text{DRX\_Cycle\_Length}+n*\text{DRX\_Cycle\_Length};$$

wherein n is 0 or a positive integer, start-Sub_frame_num denotes a number of a start radio subframe of the radio subframe on which data is received in the long discontinuous reception cycle; start-Sub_frame_num is not greater than a maximum subframe number (4096*5−1); and mod denotes modulo; and
determining, by the user equipment, and according to the start subframe of the radio subframe on which the user equipment receives the data in the long discontinuous reception cycle and the length of receiving data in the long discontinuous reception cycle, the radio subframe on which the user equipment receives the data in the long discontinuous reception cycle; wherein the cycle length of the long discontinuous reception cycle and the length of receiving data in the long discontinuous reception cycle are denoted by the number of the radio subframes.

11. The method according to claim 1, wherein the radio frame and a number of a start frame of the radio subframe on which the user equipment receives data in the long discontinuous reception cycle are determined according to the following formula:

$$\text{SFN}*M+\text{start-Sub\_frame\_num}=\text{H-RNTI} \bmod \text{DRX\_Cycle\_Length}+n*\text{DRX\_Cycle\_Length};$$

wherein M denotes the number of radio subframes comprised in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo; and
determining, by the user equipment, and according to the radio frame and the start subframe of the radio subframe on which data is received in the long discontinuous reception cycle and the length of receiving data in the long discontinuous reception cycle, the radio frame and the radio subframe on which the user equipment receives the data in the long discontinuous reception cycle; wherein the cycle length of the long discontinuous reception cycle and the length of receiving data in the long discontinuous reception cycle are denoted by the number of the radio subframes.

12. The method according to claim 1, wherein the determining, by the user equipment, and according to the high speed downlink shared channel-radio network temporary identifier of the user equipment and the cycle length of the long discontinuous reception cycle, the radio frame on which data is received in the long discontinuous reception cycle comprises one of the following:
(a) determining, by the user equipment, and according to the high speed downlink shared channel-radio network temporary identifier of the user equipment and the cycle length of the long discontinuous reception cycle, the radio frame on which the user equipment receives the data in the long discontinuous reception cycle, by adopting the following formula:

$$(\text{SFN}-\text{H-RNTI}+65536) \bmod \text{DRX\_Cycle\_Length} < 1;$$

wherein SFN denotes the radio frame on which the user equipment receives the data in the long discontinuous reception cycle, H-RNTI is the high speed downlink shared channel-radio network temporary identifier of the user equipment, DRX_Cycle_Length is the cycle length of the long discontinuous reception cycle, mod denotes modulo; and the cycle length of the long discontinuous reception cycle is denoted by the number of radio frames; and
(b) determining, by the user equipment, and according to the high speed downlink shared channel-radio network temporary identifier of the user equipment and the cycle length of the long discontinuous reception cycle, the radio frame on which the user equipment receives the data in the long discontinuous reception cycle, by adopting the following formula:

$$SFN = H\text{-}RNTI \bmod DRX\_Cycle\_Length + n*DRX\_Cycle\_Length;$$

wherein SFN denotes the radio frame on which the user equipment receives the data in the long discontinuous reception cycle, n is 0 or a positive integer; H-RNTI is the high speed downlink shared channel-radio network temporary identifier of the user equipment, DRX_Cycle_Length is the cycle length of the long discontinuous reception cycle, mod denotes modulo; and the cycle length of the long discontinuous reception cycle is denoted by the number of radio frames.

13. The method according to claim 1, wherein the determining, by the user equipment, radio subframes in the radio frame on which the user equipment receives the data in the long discontinuous reception cycle comprises one of the following:
(a) determining, by the user equipment, and according to the high speed downlink shared channel-radio network temporary identifier of the user equipment, the number of the radio subframes comprised in the radio frame on which data is received in the long discontinuous reception cycle, and the cycle length of the long discontinuous reception cycle, the radio subframes in the radio frame on which the user equipment receives data in the long discontinuous reception cycle, by adopting the following formula:

$$\text{Sub-frame-number} = \text{floor}(H\text{-}RNTI \text{ div } DRX\_Cycle\_Length) \bmod N$$

wherein Sub-frame-number denotes a radio subframe number, floor denotes rounding down to the nearest integer; N denotes the number of radio subframes comprised in one radio frame; div denotes division, H-RNTI is the high speed downlink shared channel-radio network temporary identifier of the user equipment, DRX_Cycle_Length is the cycle length of the long discontinuous reception cycle; and mod denotes modulo; and
(b) determining, by the user equipment, and according to the high speed downlink shared channel-radio network temporary identifier of the user equipment and the number of the radio subframes comprised in the radio frame on which data is received in the long discontinuous reception cycle, the radio subframes in the radio frame on which the user equipment receives data in the long discontinuous reception cycle, by adopting the following formula:

$$\text{Sub-frame-number} = H\text{-}RNTI \bmod N;$$

wherein Sub-frame-number denotes a number of the radio subframe in the radio frame on which the user equipment receives data in the long discontinuous reception cycle, N denotes the number of radio subframes comprised in one radio frame; div denotes division, H-RNTI is the high speed downlink shared channel-radio network temporary identifier of the user equipment, DRX_Cycle_Length is the cycle length of the long discontinuous reception cycle; and mod denotes modulo.

14. The method according to claim 1, wherein the determining, by the user equipment, radio subframes in the radio frame on which data is received in the long discontinuous reception cycle comprises:

(Sub_frame-H-RNTI+65536) mod 5<DRX_On_Length mod 5, wherein the value range of Sub-frame is an integer from 0 to 4, or
(Sub_frame-H-RNTI+65536) mod 5<DRX_On_Length mod 5+1, wherein the value range of the subframe number is an integer from 1 to 5;
wherein Sub_frame is a number of a radio subframe in the radio frame, H-RNTI is the high speed downlink shared channel-radio network temporary identifier of the user equipment, DRX_On_Length is the length of receiving data in the long discontinuous reception cycle, and is denoted by the number of radio subframes; and,
wherein the determining, radio subframes in the radio frame on which the user equipment receives the data in the long discontinuous reception cycle further comprises:
using first N subframes of one radio frame as the radio subframes of the radio frame on which data is received in the long discontinuous reception cycle, wherein N=DRX_On_Length mod 5.

15. The method according to claim 1, wherein the determining, by the user equipment, and according to the high speed downlink shared channel-radio network temporary identifier of the user equipment and the cycle length of the long discontinuous reception cycle, the radio frame on which data is received in the long discontinuous reception cycle comprises:
determining, by the user equipment, and according to the high speed downlink shared channel-radio network temporary identifier of the user equipment and the cycle length of the long discontinuous reception cycle, the radio frame on which the user equipment receives the data in the long discontinuous reception cycle, by adopting the following formula:

$$(SFN\text{-}H\text{-}RNTI+65536) \bmod DRX\_Cycle\_Length < DRX\_On\_Length;$$

wherein SFN denotes a number of the radio frame on which the user equipment receives data in the long discontinuous reception cycle number; H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle, mod denotes modulo; and the cycle length of the long discontinuous reception cycle and the length of the receiving data in the long discontinuous reception cycle are denoted by the number of radio frames.

16. The method according to claim 1, wherein, the determining, by the user equipment, radio subframes in the radio frame on which the user equipment receives the data in the long discontinuous reception cycle comprises:
determining, by the user equipment, and according to the high speed downlink shared channel-radio network temporary identifier of the user equipment and the number of the radio subframes comprised in the radio frame on which data is received in the long discontinuous reception cycle, the radio subframes in the radio frame on which the user equipment receives the data in the long discontinuous reception cycle, by adopting the following formula:

$$(\text{Sub-frame-number}\text{-}H\text{-}RNTI+65536) \bmod (N*\text{Ceil}[DRX\_On\_Length \text{ div } N]) < DRX\_On\_Length;$$

wherein Sub-frame-number denotes a number of a radio subframe in the radio frame on which the user equipment receives the data in the long discontinuous reception cycle number, N denotes the number of radio subframes comprised in one radio frame; div denotes division, Ceil denotes rounding up to a nearest integer, H-RNTI is the high speed downlink shared channel-radio network temporary identifier of the user equipment; DRX_On_Length is the length of the receiving data in the long discontinuous reception cycle; and mod denotes modulo.

17. The method according to claim 1, wherein determining, by the user equipment, radio subframes in the radio frame on which the user equipment receives the data in the long discontinuous reception cycle comprises:
   receiving, by the user equipment, identifiers corresponding to the radio subframes in the radio frame on which the user equipment receives the data in the long discontinuous reception cycle sent by the radio network controller, and the radio subframes are configured by the radio network controller.

18. A user equipment, comprising:
   a receiver, configured to receive a long discontinuous reception parameter sent by a radio network controller, wherein the long discontinuous reception parameter comprises at least two of a cycle length of a long discontinuous reception cycle, a length of receiving data in the long discontinuous reception cycle, and a length of not receiving data in the long discontinuous reception cycle, wherein the cycle length of the long discontinuous reception cycle is denoted by a number of radio frames in the long discontinuous reception cycle;
   at least one chip, configured to determine, when the user equipment enters a cell-forward access channel state, and according to a third timer and a third preset duration corresponding to the third timer, that the user equipment enters the long discontinuous reception cycle; and
   the at least one chip, configured to determine, when the user equipment enters the long discontinuous reception cycle, and according to a high speed downlink shared channel-radio network temporary identifier of the user equipment, the cycle length of the long discontinuous reception cycle, and the length of receiving data in the long discontinuous reception cycle, the radio frames on which data is received in the long discontinuous reception cycle.

19. The user equipment according to claim 18, wherein:
   the receiver is further configured to receive, on the radio subframe on which data is received in the long discontinuous reception cycle, data sent by the base station.

20. The user equipment according to claim 18, wherein the at least one chip comprises:
   a control circuit, configured to start or restart the third timer when the user equipment enters the cell-forward access channel state, and the user equipment does not occupy a common enhanced-dedicated channel resource and monitors its own high speed downlink shared channel-radio network temporary identifier on a high speed-shared control channel; wherein the third timer expires when running till the third preset duration is up; and
   the at least one chip, configured to, when the first timer starts and runs till the first preset duration is up, and the third timer expires, determine that the user equipment enters the long discontinuous reception cycle.

21. The user equipment according to claim 20, wherein:
   the control circuit is further configured to start a fourth timer before or while starting or restarting the third timer when the user equipment enters the cell-forward access channel state, and the user equipment does not occupy a common enhanced-dedicated channel resource and monitors its own high speed downlink shared channel-radio network temporary identifier on the high speed-shared control channel, wherein a fourth preset duration is set on the fourth timer; and
   the at least one chip is further configured to, when the fourth timer starts and runs till the fourth preset duration is up, and the fourth timer expires, determine that the user equipment enters a short discontinuous reception cycle.

22. The user equipment according to claim 21, further comprising:
   the at least one chip, configured to, in a process that the third timer starts and runs in the third preset duration, and when the user equipment wins the common enhanced-dedicated channel resource allocated by the base station, stop the third timer, and receive the data sent by the base station continuously on the high speed downlink shared channel; wherein
   the at least one chip is further configured to, in a process that the fourth timer starts and runs in the fourth preset duration, and when the user equipment wins the common enhanced-dedicated channel resource allocated by the base station, stop the fourth timer, and receive data sent by the base station on the high speed downlink shared channel continuously.

23. The user equipment according to claim 18, wherein the at least one chip is further configured to, when the user equipment enters the long discontinuous reception cycle, determine the radio subframe on which the user equipment receives data in the long discontinuous reception cycle according to the following formula:

$$(\text{Sub\_frame\_num} - \text{H-RNTI} + 65536) \bmod \text{DRX\_Cycle\_Length} < \text{DRX\_On\_Length}$$

wherein Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of receiving data in the long discontinuous reception cycle; mod denotes modulo; and the cycle length of the long discontinuous reception cycle and the length of receiving data in the long discontinuous reception cycle are denoted by the number of the radio subframes.

24. The user equipment according to claim 23, wherein the at least one chip is further configured to:
   determine a corresponding radio frame and radio subframes in the radio frame according to the obtained radio subframe on which the user equipment receives the data in the long discontinuous reception cycle.

25. The user equipment according to claim 24, wherein the determining a corresponding radio frame and radio subframes in the radio frame according to the obtained radio subframe on which the user equipment receives the data in the long discontinuous reception cycle specifically comprises:
   radio frame=Sub_frame_num div M; and radio subframe in the radio frame=Sub_frame_num mod M, wherein M denotes the number of radio subframes comprised in one radio frame, div denotes division, and mod denotes modulo.

26. The user equipment according to claim 18, wherein the at least one chip is further configured to, when the user equipment enters the long discontinuous reception cycle, determine the radio subframe on which the user equipment receives data in the long discontinuous reception cycle and radio frame according to the following formula:

$$(N*SFN+Sub\_frame\_num-H-RNTI+65536) \bmod DRX\_Cycle\_Length < DRX\_On\_Length;$$

wherein N denotes the number of radio subframes comprised in one radio frame, SFN denotes a number of a system frame on which data is received in the long discontinuous reception cycle, and is denoted by the radio frame, Sub_frame_num denotes a number of the radio subframe on which data is received in the long discontinuous reception cycle, H-RNTI is the high speed downlink shared channel-radio network temporary identifier of the user equipment, DRX_Cycle_Length is the cycle length of the long discontinuous reception cycle, DRX_On_Length is the length of the receiving data in the long discontinuous reception cycle; mod denotes modulo; and the cycle length of the long discontinuous reception cycle and the length of the receiving data in the long discontinuous reception cycle are denoted by the number of the radio subframes.

27. The user equipment according to claim 18, wherein the at least one chip is further configured to, when the user equipment enters the long discontinuous reception cycle, determine a start subframe of the radio subframe on which the user equipment receives data in the long discontinuous reception cycle according to the following formula:

$$\text{start-Sub\_frame\_num} = H\text{-}RNTI \bmod DRX\_Cycle\_Length + n*DRX\_Cycle\_Length;$$

wherein n is 0 or a positive integer, start-Sub_frame_num denotes a number of a start radio subframe of the radio subframe on which data is received in the long discontinuous reception cycle; start-Sub_frame_num is not greater than a maximum subframe number (4096*5−1); mod denotes modulo; and determine, according to the start subframe of the radio subframe on which the user equipment receives data in the long discontinuous reception cycle and the length of receiving data in the long discontinuous reception cycle, the radio subframe on which the user equipment receives data in the long discontinuous reception cycle; wherein the cycle length of the long discontinuous reception cycle and the length of receiving data in the long discontinuous reception cycle are denoted by the number of the radio subframes.

28. The user equipment according to claim 18, wherein the at least one chip is further configured to, when the user equipment enters the long discontinuous reception cycle, determine the radio frame and a number of a start frame of the radio subframe on which the user equipment receives data in the long discontinuous reception cycle according to the following formula:

$$SFN*M + \text{start-Sub\_frame\_num} = H\text{-}RNTI \bmod DRX\_Cycle\_Length + n*DRX\_Cycle\_Length;$$

wherein M denotes the number of radio subframes comprised in one radio frame, SFN denotes a number of a system frame on which data starts to be received in the long discontinuous reception cycle, and is denoted by the radio frame, start-Sub_frame_num denotes a number of a radio subframe on which data starts to be received in the long discontinuous reception cycle; n is 0 or a positive integer; and mod denotes modulo; and the user equipment determines, according to the radio frame and the start subframe of the radio subframe on which data is received in the long discontinuous reception cycle and the length of the receiving data in the long discontinuous reception cycle, the radio frame and the radio subframe on which the user equipment receives data in the long discontinuous reception cycle; wherein the cycle length of the long discontinuous reception cycle and the length of receiving data in the long discontinuous reception cycle are denoted by the number of the radio subframes.

29. The user equipment according to claim 18, wherein the at least one chip is further configured to implement one of the following:

(a) determining, according to the high speed downlink shared channel-radio network temporary identifier of the user equipment and the cycle length of the long discontinuous reception cycle, the radio frame on which the user equipment receives data in the long discontinuous reception cycle, by adopting the following formula:

$$(SFN\text{-}H\text{-}RNTI+65536) \bmod DRX\_Cycle\_Length < 1;$$

wherein SFN denotes the radio frame on which the user equipment receives data in the long discontinuous reception cycle, H-RNTI is the high speed downlink shared channel-radio network temporary identifier of the user equipment, DRX_Cycle_Length is the cycle length of the long discontinuous reception cycle, mod denotes modulo; and the cycle length of the long discontinuous reception cycle is denoted by the number of radio frames; and (b) determining, according to the high speed downlink shared channel-radio network temporary identifier of the user equipment and the cycle length of the long discontinuous reception cycle, the radio frame on which the user equipment receives data in the long discontinuous reception cycle, by adopting the following formula:

$$SFN = H\text{-}RNTI \bmod DRX\_Cycle\_Length + n*DRX\_Cycle\_Length;$$

wherein SFN denotes the radio frame on which the user equipment receives data in the long discontinuous reception cycle, n is 0 or a positive integer; H-RNTI is the high speed downlink shared channel-radio network temporary identifier of the user equipment, DRX_Cycle_Length is the cycle length of the long discontinuous reception cycle, mod denotes modulo; and the cycle length of the long discontinuous reception cycle is denoted by the number of radio frames.

30. The user equipment according to claim 18, wherein the at least one chip is further configured to implement one of the following:

(a) determining, according to the high speed downlink shared channel-radio network temporary identifier of the user equipment, the number of the radio subframes comprised in the radio frame on which data is received in the long discontinuous reception cycle, and the cycle length of the long discontinuous reception cycle, the radio subframes in the radio frame on which the user equipment receives the data in the long discontinuous reception cycle, by adopting the following formula:

$$\text{Sub-frame-number} = \text{floor}(H\text{-}RNTI \text{ div } DRX\_Cycle\_Length) \bmod N$$

wherein Sub-frame-number denotes a radio subframe number, floor denotes rounding down to the nearest integer; N denotes the number of radio subframes comprised in one radio frame; div denotes division, H-RNTI is the high speed downlink shared channel-radio network temporary identifier of the user equipment, DRX_Cycle_Length is the cycle length of the long discontinuous reception cycle; and mod denotes modulo; and (b) determining, according to the high speed downlink shared channel-radio network temporary identifier of the user equipment and the number of the radio subframes comprised in the radio frame on which data is received in the long discontinuous reception cycle, the radio subframes in the radio frame on which the user equipment receives data in the long discontinuous reception cycle, by adopting the following formula:

Sub-frame-number=H-RNTI mod N;

wherein Sub-frame-number denotes a number of a radio subframe in the radio frame on which the user equipment receives data in the long discontinuous reception cycle number, N denotes the number of radio subframes comprised in one radio frame; div denotes division, H-RNTI is the high speed downlink shared channel-radio network temporary identifier of the user equipment, DRX_Cycle_Length is the cycle length of the long discontinuous reception cycle; and mod denotes modulo.

31. The user equipment according to claim 18, wherein that the at least one chip determines the radio subframes in the radio frame on which the user equipment receives the data in the long discontinuous reception cycle further comprises one of the following:

(a) (Sub_frame-H-RNTI+65536) mod 5<DRX_On_Length mod 5, wherein the value range of Sub-frame is an integer from 0 to 4, and (b) (Sub_frame-H-RNTI+65536) mod 5<DRX_On_Length mod 5+1, wherein the value range of the subframe number is an integer from 1 to 5;

wherein Sub_frame is a number of a radio subframe in the radio frame, H-RNTI is the high speed downlink shared channel-radio network temporary identifier of the user equipment, DRX_On_Length is the length of receiving data in the long discontinuous reception cycle, and is denoted by the number of radio subframes; and, wherein that the at least one chip determines the radio subframes in the radio frame on which the user equipment receives the data in the long discontinuous reception cycle further comprises:

using first N subframes of one radio frame as the radio subframes of the radio frame on which data is received in the long discontinuous reception cycle, wherein N=DRX_On_Length mod 5.

32. The user equipment according to claim 18, wherein the at least one chip is further configured to determine, according to the high speed downlink shared channel-radio network temporary identifier of the user equipment and the cycle length of the long discontinuous reception cycle, the radio frame on which the user equipment receives the data in the long discontinuous reception cycle, by adopting the following formula:

(SFN-H-RNTI+65536)mod DRX_Cycle_Length<DRX_On_Length;

wherein SFN denotes a number of the radio frame on which the user equipment receives the data in the long discontinuous reception cycle number; H-RNTI is the high speed downlink shared channel-radio network temporary identifier of the user equipment, DRX_Cycle_Length is the cycle length of the long discontinuous reception cycle, DRX_On_Length is the length of the receiving data in the long discontinuous reception cycle, mod denotes modulo; and the cycle length of the long discontinuous reception cycle and the length of the receiving data in the long discontinuous reception cycle are denoted by the number of radio frames.

33. The user equipment according to claim 18, wherein the at least one chip is further configured to determine, according to the high speed downlink shared channel-radio network temporary identifier of the user equipment and the number of the radio subframes comprised in the radio frame on which data is received in the long discontinuous reception cycle, the radio subframes in the radio frame on which the user equipment receives the data in the long discontinuous reception cycle, by adopting the following formula:

(Sub-frame-number-H-RNTI+65536)mod(N*Ceil [DRX_On_Length div N])<DRX_On_Length;

wherein Sub-frame-number denotes a number of a radio subframe in the radio frame on which the user equipment receives data in the long discontinuous reception cycle number, N denotes the number of radio subframes comprised in one radio frame; div denotes division, Ceil denotes rounding up to a nearest integer, H-RNTI is the high speed downlink shared channel-radio network temporary identifier of the user equipment, DRX_On_Length is the length of receiving data in the long discontinuous reception cycle; and mod denotes modulo.

34. The user equipment according to claim 18, wherein the at least one chip is further configured to receive identifiers corresponding to the radio subframes in the radio frame on which the user equipment receives the data in the long discontinuous reception cycle sent by the radio network controller, and the radio subframes are configured by the radio network controller.

\* \* \* \* \*